United States Patent [19]
Colborn

[11] Patent Number: 6,153,328
[45] Date of Patent: Nov. 28, 2000

[54] SYSTEM AND METHOD FOR PREVENTING THE FORMATION OF DENDRITES IN A METAL/AIR FUEL CELL, BATTERY OR METAL RECOVERY APPARATUS

[75] Inventor: Jeffrey A. Colborn, Cardiff, Calif.

[73] Assignee: Metallic Power, Inc., Carlsbad, Calif.

[21] Appl. No.: 09/449,176

[22] Filed: Nov. 24, 1999

[51] Int. Cl.[7] .................................................. H01M 2/38
[52] U.S. Cl. .................. 429/51; 429/21; 429/27; 429/38; 429/39; 429/49; 429/81; 429/229; 429/216
[58] Field of Search .................... 429/229, 216, 429/15, 21, 27, 38, 39, 34, 51, 49, 63, 81

[56] References Cited

U.S. PATENT DOCUMENTS

| | | |
|---|---|---|
| 3,440,098 | 4/1969 | Stachurski . |
| 3,451,851 | 6/1969 | Stanimirovitch . |
| 3,639,173 | 2/1972 | Stachurski . |
| 3,660,170 | 5/1972 | Rampel . |
| 3,716,413 | 2/1973 | Eisner . |
| 3,762,959 | 10/1973 | McCoy . |
| 3,767,466 | 10/1973 | McCoy et al. . |
| 3,773,561 | 11/1973 | Bjorkman . |
| 3,923,550 | 12/1975 | von Krusentierna . |
| 3,930,882 | 1/1976 | Ohsawa et al. . |
| 3,944,430 | 3/1976 | Lee . |
| 3,953,241 | 4/1976 | Langer et al. . |
| 3,970,472 | 7/1976 | Steffensen .................... 136/3 |
| 4,074,028 | 2/1978 | Will . |
| 4,145,482 | 3/1979 | von Benda . |
| 4,209,577 | 6/1980 | Clash . |
| 4,218,521 | 8/1980 | Putt et al. ................... 429/39 |
| 4,415,636 | 11/1983 | Charkey . |
| 4,479,856 | 10/1984 | Ando . |
| 4,563,403 | 1/1986 | Julian . |
| 4,812,375 | 3/1989 | Foster . |
| 4,842,963 | 6/1989 | Ross, Jr. . |
| 4,855,030 | 8/1989 | Miller . |
| 4,857,419 | 8/1989 | Jinnai et al. . |
| 5,074,969 | 12/1991 | Brewer et al. . |
| 5,348,820 | 9/1994 | Suga et al. . |
| 5,366,829 | 11/1994 | Saidi . |
| 5,382,482 | 1/1995 | Suga et al. . |
| 5,427,872 | 6/1995 | Shen et al. . |
| 5,434,021 | 7/1995 | Fauteux et al. . |
| 5,547,778 | 8/1996 | Fauteux et al. . |
| 5,780,186 | 7/1998 | Casey, Jr. . |
| 5,795,679 | 8/1998 | Kawakami et al. . |
| 5,824,434 | 10/1998 | Kawakami et al. . |
| 6,086,733 | 7/2000 | Carey et al. ................. 204/242 |

Primary Examiner—Maria Nuzzolillo
Assistant Examiner—Angela J. Martin
Attorney, Agent, or Firm—Howrey Simon Arnold & White, LLP

[57] ABSTRACT

A System and method is disclosed for preventing dendrite formation in a fuel cell, battery or metal recovery system. Typical metal/air fuel cell stacks comprise a plurality of cells electrically coupled together in a serial fashion. Electrolyte is typically pumped through the cells on a continuous basis using an input and output manifold device having a number of channels equal to the number of cells comprising the stack. This parallel connection causes the formation of metallic dendrites in the channels, which can short circuit the fuel cell stack or battery or metal-recovery apparatus. The system and method provides one or more dendrite elimination zones to prevent the formation of dendrites. The dendrite elimination zones are constructed within each cell or within each manifold to prevent the electrochemical reaction associated with dendrites from taking place. The dendrite elimination zones are characterized by the substantial lack of a metal negative electrode, such as zinc, in the volume of the zone, and the substantial presence of a cell positive electrode through the volume or adjacent to the volume.

26 Claims, 18 Drawing Sheets

BiPolar Stack

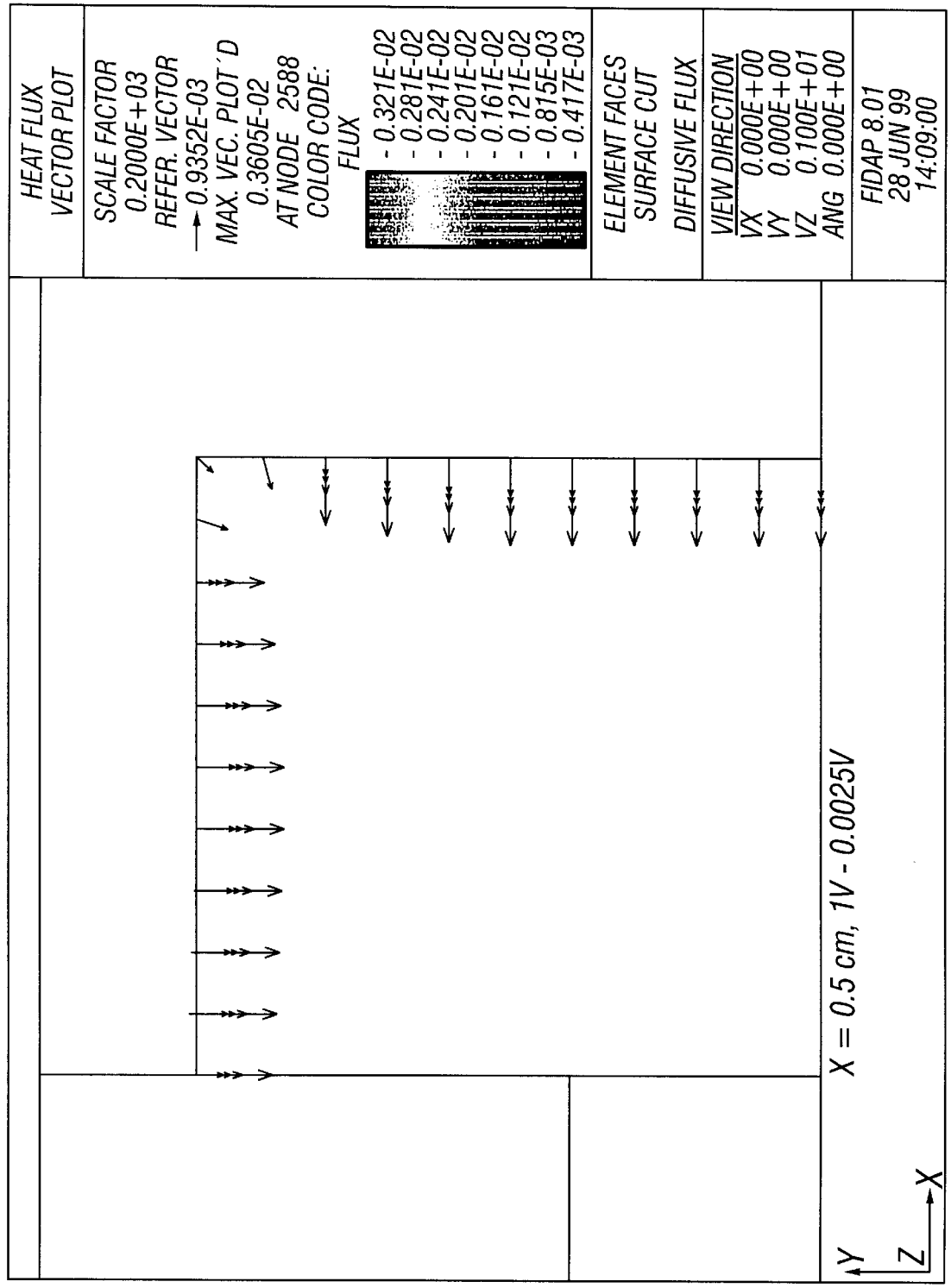

SYSTEM AND METHOD FOR PREVENTING THE FORMATION OF DENDRITES IN A METAL/AIR FUEL CELL, BATTERY OR METAL RECOVERY APPARATUS

BACKGROUND OF THE INVENTION

1. Field of the Invention

The present invention relates generally to a system and method for eliminating short circuits caused by the production of dendrites in a fuel cell, battery or metal recovery apparatus.

2. Related Art

One of the more promising alternatives to conventional power sources in existence today is the metal/air fuel cell. These fuel cells have tremendous potential because they are efficient, environmentally safe and completely renewable. Metal/air fuel cells can be used for both stationary and mobile applications, and are especially suitable for use in all types of electric vehicles.

Metal/air fuel cells and batteries produce electricity by electrochemically combining metal with oxygen from the air. Zinc, Iron, Lithium, and Aluminum are some of the metals that can be used. Oxidants other than air, such as pure oxygen, bromine, or hydrogen peroxide can also be used. Zinc/air fuel cells and batteries produce electricity by the same electrochemical processes. But zinc/air fuel cells are not discarded like primary batteries. They are not slowly recharged like secondary batteries, nor are they rebuilt like "mechanically recharged" batteries. Instead, zinc/air fuel cells are conveniently refueled in minutes or seconds by adding additional zinc when necessary. Further, the zinc used to generate electricity is completely recoverable and reusable.

The zinc/air fuel cell is expected to displace lead-acid batteries where higher specific energies are required and/or rapid recharging is desired. Further, the zinc/air fuel cell is expected to displace internal combustion engines where zero emissions, quiet operation, and/or lower maintenance costs are important.

In one example embodiment, the zinc "fuel" is in the form of particles. Zinc is consumed and releases electrons to drive a load (the anodic part of the electrochemical process), and oxygen from ambient air accepts electrons from the load (the cathodic part).

The overall chemical reaction produces zinc oxide, a non-toxic white powder. When all or part of the zinc has been consumed and hence transformed into zinc oxide, the fuel cell can be refueled by removing the reaction product and adding fresh zinc particles and electrolyte.

The zinc oxide (ZnO) product is typically reprocessed into zinc particles and oxygen in a separate, stand-alone recycling unit using electrolysis. The whole process is a closed cycle for zinc and oxygen, which can be recycled indefinitely.

In general, a zinc/air fuel cell system comprises two principal components: the fuel cell itself and a zinc recovery apparatus. The recovery apparatus is generally stationary and serves to supply the fuel cell with zinc particles, remove the zinc oxide, and convert it back into zinc metal fuel particles. A metal recovery apparatus may also be used to recover zinc, copper, or other metals from solution for any other purpose.

The benefits of zinc/air fuel cell technology over rechargeable batteries such as lead-acid batteries are numerous. These benefits include very high specific energies, high energy densities, and the de-coupling of energy and power densities. Further, these systems provide rapid on-site refueling that requires only a standard electrical supply. Still further, these systems provide longer life potentials, and the availability of a reliable and accurate measure of remaining energy at all times.

The benefits over internal combustion engines include zero emissions, quiet operation, lower maintenance costs, and higher specific energies. When replacing lead-acid batteries, zinc/air fuel cells can be used to extend the range of a vehicle or reduce the weight for increased payload capability and/or enhanced performance. The zinc/air fuel cell gives vehicle designers additional flexibility to distribute weight for optimizing vehicle dynamics.

Typical zinc/air fuel cell stacks comprise a plurality of cells electrically coupled together serially. During operation of a zinc/air fuel cell stack, a supply of electrolyte is generally pumped through the cells continuously. This can also be useful in a zinc/air battery or in a zinc recovery apparatus. Electrolyte is typically pumped through the fuel cell stack using an input and output manifold device having a number of channels equal to the number of cells comprising the fuel cell stack. This parallel connection causes the formation of dendrites in the channels which can short circuit the fuel cell stack and block electrolyte flow.

A related dendrite formation problem has been addressed in U.S. Pat. No. 3,773,561 to Bjorkman. However, this patent proposes a solution to prevent the growth of dendrites and short-circuiting through electrolyte channels when a battery or fuel cell is shut down, and no electrolyte is flowing through the system.

Thus, what is needed is a system and method for eliminating short circuits and electrolyte channel blockage caused by the production of dendrites in an active fuel cell, battery or metal recovery apparatus, when electrolyte is flowing through the system.

SUMMARY OF THE INVENTION

Accordingly, the present invention prevents dendrite formation in zinc/air fuel cells and/or other types of fuel cells, batteries, and/or metal recovery systems. A zinc/air fuel cell stack comprises a plurality of zinc/air cells that are electrically coupled together in a serial fashion to produce electricity. Typically, electrolyte comprising highly concentrated potassium hydroxide (KOH) in aqueous solution is continuously pumped through each of the cells in the fuel cell stack. Other electrolytes may be used.

An input and output manifold device having a number of channels equal to the number of cells comprising the stack, is typically employed for pumping electrolyte in and out of each cell in a parallel fashion. The problem is that this parallel connection comprising electrically conductive electrolyte causes the formation of zinc dendrites in the channels. When the zinc dendrites grow to a sufficient length into the channel, a catastrophic short circuit can be formed. Also, the dendrites can interfere with proper electrolyte flow.

The present invention provides for one or more dendrite elimination zones (DEZs) to prevent the formation of dendrites. The dendrite elimination zones are constructed within each cell to prevent the electrochemical reaction associated with dendrite formation from taking place. Each zone is characterized by the substantial absence of the metal negative electrode from the volume of the zone, and the substantial presence of the positive electrode through the volume or adjacent to a surface of the zone. In addition, each zone is situated at an area which is susceptible to dendrite formation, i.e., at about the interface between the conduit of the manifold and a cell.

DEZs can be used to eliminate dendrites in zinc/air fuel cells, batteries, zinc recovery systems, and other electrochemical systems. In one embodiment comprising a zinc/air fuel cell, the dendrite elimination zone prevents zinc fuel particles or any electronic conductor in contact with the zinc particles from being present in an area where electrolyte enters and exits the fuel cells. In one implementation, the zinc negative electrode is retracted away from the interface between the conduit of the manifold and the cell such that zinc is not present in the area(s) susceptible to dendrite formation. In another implementation, the positive electrode is extended through the interface between the conduit of the manifold and the cell and into the manifold itself. In addition, no conductor of electrons in contact with the zinc negative electrode is substantially present in these zones. Typically, the zones most susceptible to dendrite formation are in the manifold channel just beyond the influence of the positive electrode, or near the edge of the cell and adjacent to the manifold channel. These susceptible zones are characterized by an increasing influence of higher potential neighboring cells on the local electric field near the zinc negative electrode surface relative to the influence of the positive electrode. Because the negative electrode or a conductor of electrons in contact with the negative electrode is no longer present in the dendrite elimination zone, the electrochemical reaction associated with the dendrites cannot take place and dendrites are therefore eliminated.

BRIEF DESCRIPTION OF THE FIGURES

The present invention is described with reference to the accompanying drawings, wherein.

In the figures, like reference numbers generally indicate identical, functionally similar, and/or structurally similar elements.

DETAILED DESCRIPTION OF THE PREFERRED EMBODIMENTS

All of the examples of the present invention presented herein are associated with a zinc/air fuel cell system and apparatus. It is important to note, however, that the present invention can be applied to other types of fuel cells, batteries and/or metal recovery systems. An example of a metal recovery system is a system that recovers zinc from aqueous solution by applying electricity. Accordingly, the examples used herein depicting zinc/air fuel cells should not be construed to limit the scope and breadth of the present invention.

Figure 1:
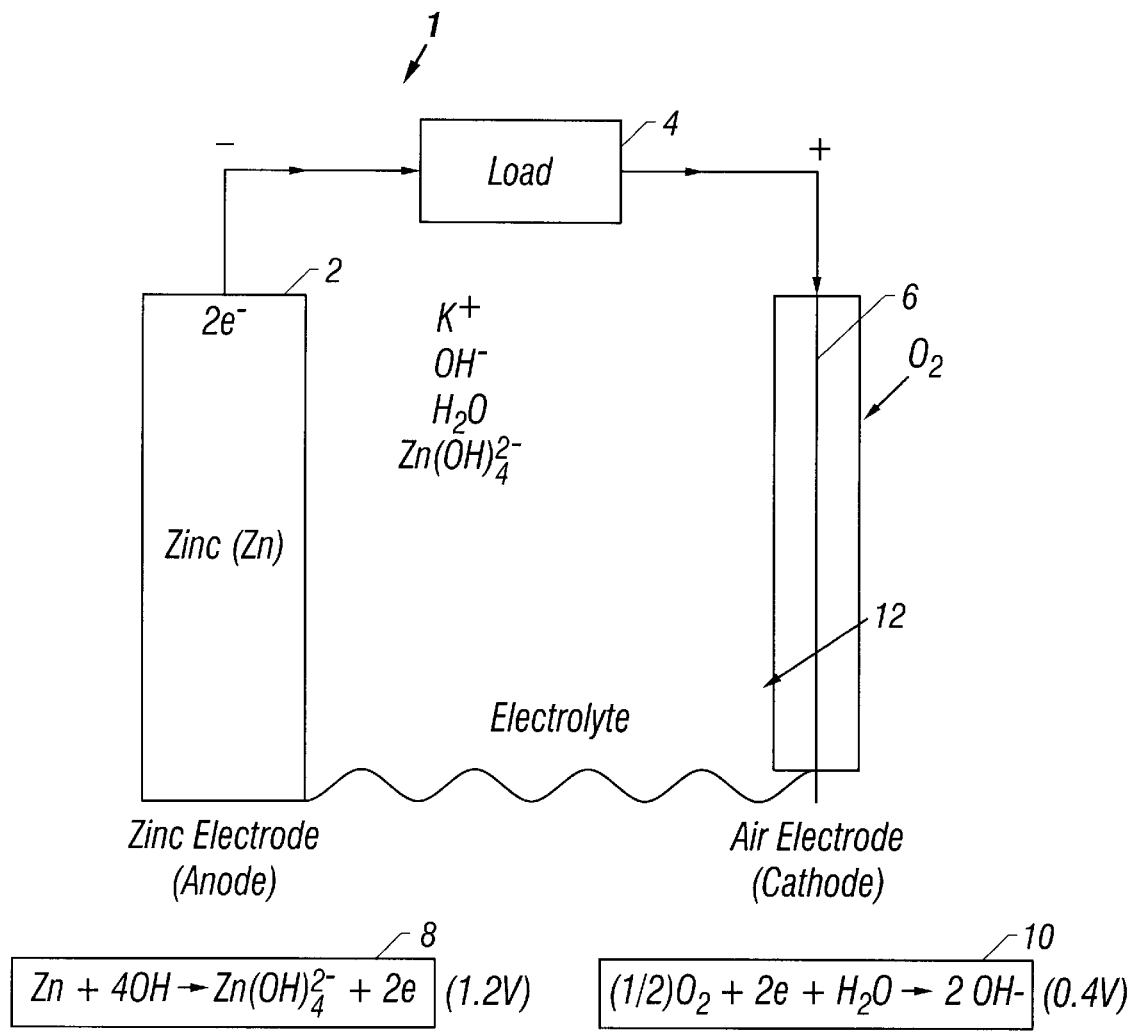
FIG. 1 depicts a block diagram showing the primary components of a single zinc/air cell and the associated electrochemical processes that generate electricity, in accordance with one embodiment of the present invention.

FIG. 1 depicts a block diagram showing the primary components of a single zinc/air cell 1 and the associated electrochemical processes that generate electricity, in accordance with one embodiment of the present invention. The zinc/air cell 1 comprises a zinc block 2 (also referred to as a zinc column 2). In one embodiment, the zinc column 2 is formed using a plurality of zinc particles. One benefit to using zinc particles rather than a solid block of zinc is that the use of small particles facilitates the refueling process. In one embodiment, refueling is accomplished by periodically depositing zinc particles as necessary. An example of a particle feeding apparatus can be found in the U.S. patent application Ser. No. 09/353,422 filed on Jul. 15, 1999, entitled "Particle Feeding Apparatus For Electrochemical Power Source and Method Of Making Same", which is incorporated herein by reference in its entirety. In other embodiments the zinc column 2 is a solid block of zinc.

As shown, the zinc column 2 forms the negative electrode of the cell 1. An air electrode 6 is the positive electrode of the cell 1. As shown, oxygen ($O_2$) is supplied through a membrane portion of the positive electrode 6. A supply of electrolyte 12, a concentrated potassium hydroxide (KOH) solution consisting of potassium ions ($K^+$), hydroxyl ions ($OH^-$), zincate ions (a reaction product) and water ($H_2O$) is contained within the fuel cell 1.

As shown in FIG. 1, two primary electrochemical reactions 8 and 10 take place at the zinc negative electrode 2 and the positive electrode 6, respectively. These reactions generate electricity for the fuel cell 1. At the zinc negative electrode 2, the following reaction takes place:

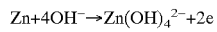

$$Zn + 4OH^- \rightarrow Zn(OH)_4^{2-} + 2e$$

Accordingly, the zinc 2 reacts with the hydroxyl in the electrolyte 12 to form a zinc reaction product, zincate and 2 electrons. As shown, the electrons drive a resistive load 4. This half-reaction 8 generates a theoretical potential of approximately 1.2 Volts. In one type of zinc-recovery apparatus, this reaction is simply reversed by applying an external voltage.

At the positive electrode 6, a second reaction takes place as follows:

$$\tfrac{1}{2}O_2 + 2e + H_2O \rightarrow 2OH-$$

This reaction 10 consumes the 2 electrons from the zinc 2, as described above, and reacts with water and oxygen to generate hydroxyl ions. This half-reaction 10 produces a theoretical potential of approximately 0.4 Volts. Thus, the total theoretical potential for this single fuel cell 1 is the sum of the potentials from the two reactions 8 and 10, or approximately 1.6 Volts. The practical open-circuit voltage is approximately 1.4 Volts. As shown, this potential generates an electron flow through the load 4 in the direction shown in FIG. 1. In one type of zinc recovery apparatus, this reaction is simply reversed by applying an external voltage.

Figure 2:
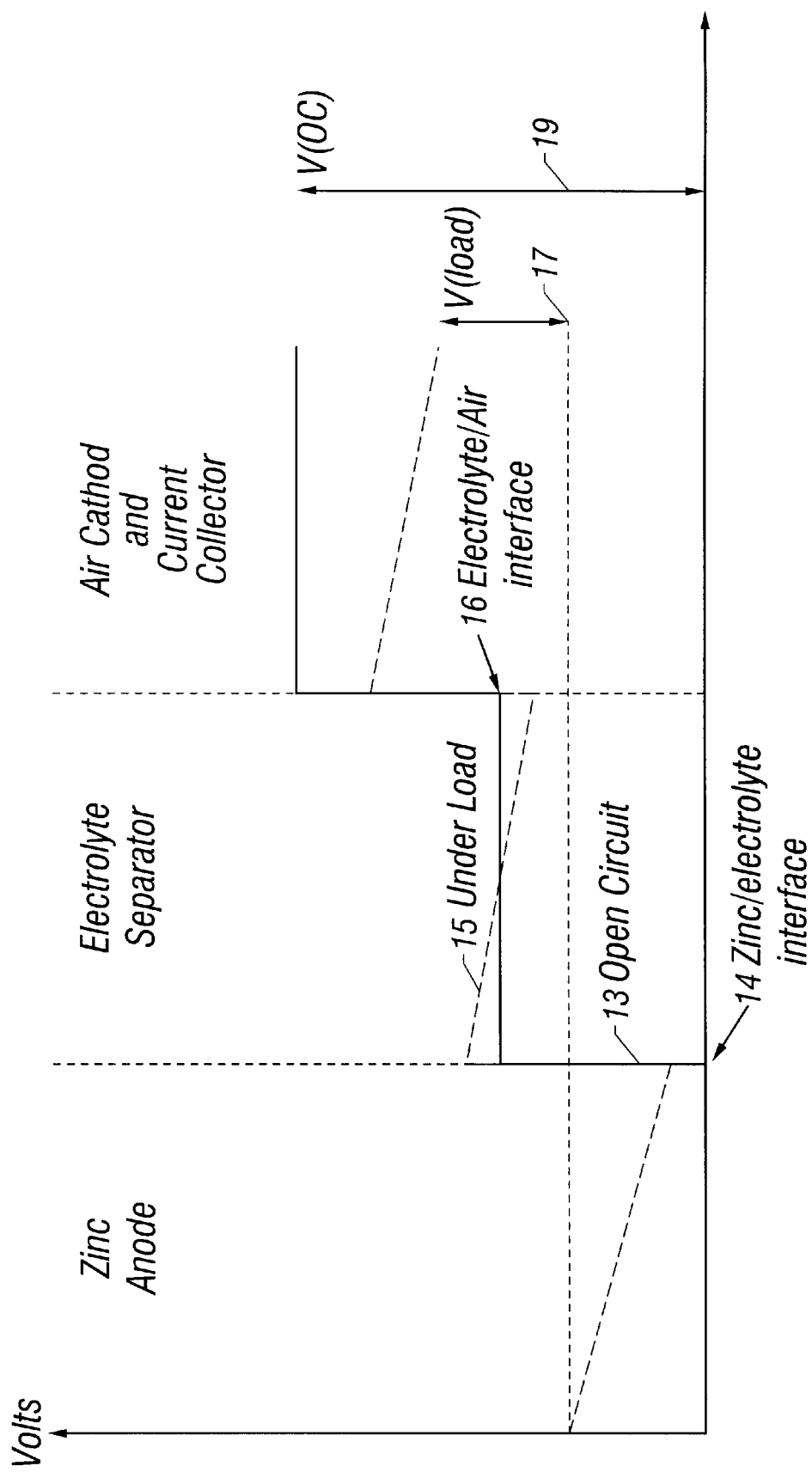
FIG. 2 is a graph that depicts electric potential profiles generated by a typical zinc/air cell.

FIG. 2 is a graph that depicts the electric potentials in a typical zinc/air cell. The solid line 13 represents the open circuit potential and the dashed line 15 represents the potential of the fuel cell under typical load conditions.

As shown, the open circuit potential remains constant through the electrodes and electrolyte in the cell 1 and rises in potential at the electrode/electrolyte interfaces 14 and 16. Specifically, the open circuit potential is defined as zero through the zinc electrode 2 and rises to a positive potential at the zinc electrolyte interface 14 as shown. The open circuit potential remains constant until it reaches the electrolyte/air positive electrode interface 16. The total open circuit potential 19 in this example embodiment is approximately 1.4 volts.

The dashed line 15 shows the potential profile under a typical resistive load, such as the load 4. As indicated, the potential is not constant throughout the interior portions of the cell under a load condition. Instead, the potential linearly decreases throughout the electrodes and electrolyte in accordance with Ohm's law, and substantially increases at the interfaces 14 and 16. The arrow 17 represents the total potential of the fuel cell 1 under a typical load condition, which is somewhat less than the open circuit potential 19.

Figure 3:
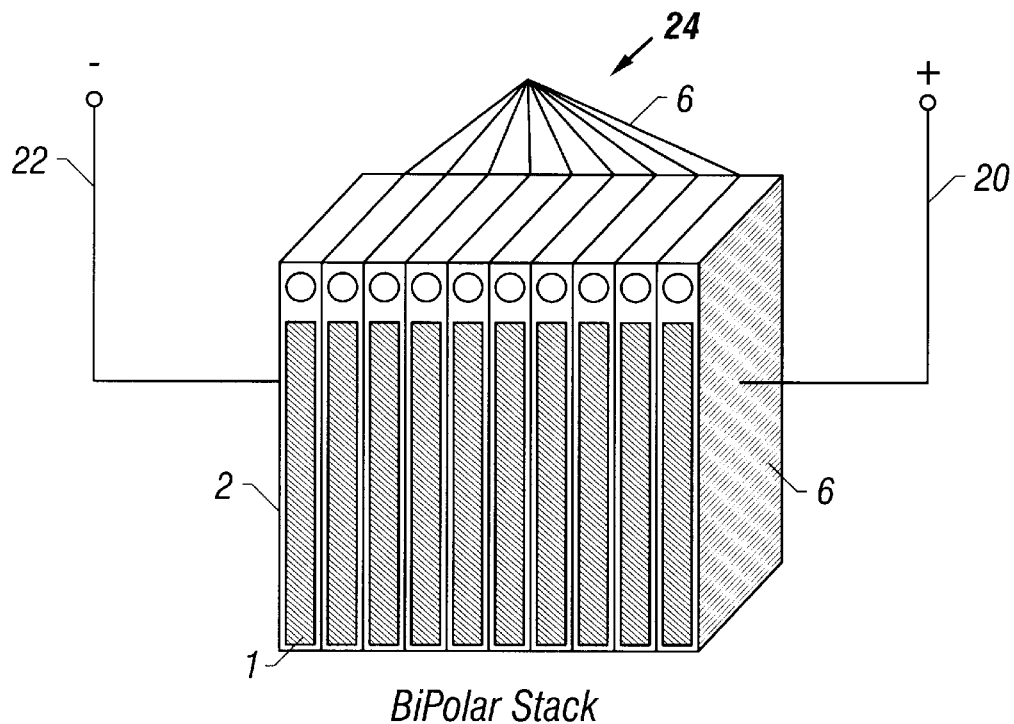
FIG. 3 is a block diagram depicting a bipolar stack of zinc/air cells in accordance with one embodiment of the present invention.

FIG. 3 is a block diagram depicting a bipolar stack 24 of cells 1. In this example, 10 individual cells 1 are stacked together to create a bipolar stack 24 having an open-circuit potential of approximately 14 Volts (i.e. 1.4 volts×10). As shown, in this embodiment, the fuel cell 1 is configured and designed such that the air positive electrode 6 comprises an entire surface of each cell 1. In this example, the air positive electrode surfaces 6 are depicted on the right side of each cell 1. Similarly, the zinc negative electrode current collector 2 comprises the entire opposite surface of each fuel cell 1. In this example, the zinc negative electrode current collectors 2 are shown on the left side of each fuel cell 1.

Accordingly, the bipolar stack 24 is created simply by stacking the fuel cells 1 such that the negative electrode current collector 2 of each cell is in physical contact with the positive electrode surface 6 of the adjacent cell 1. As stated this series connection provides a total open circuit potential (between the first negative electrode 22 and the last positive electrode 20) of approximately 14 volts. In this fashion, extremely compact high voltage bipolar stacks 24 can be built. Further, because no wires are used between the cells and the electrodes comprise large surface areas, the internal resistance between the cells 1 is extremely low.

As indicated above, a constant supply of oxygen is required for the electrochemical reaction 10 to take place at the positive electrodes 6. In one embodiment, a substance that is both porous and electrically conductive is inserted between the cells 1 to allow air to flow therein. The substance should be porous so that air can be pumped through it for supplying oxygen through the membrane in each air positive electrode 6. The substance also needs to be electrically conductive so that the negative electrode is in electrical contact with the adjacent positive electrode to achieve the low resistance series connection. In this example embodiment, as shown, nickel foam 6 is inserted between the cells for this purpose.

In one embodiment, a pump is used to supply a constant flow of air (comprising the oxygen required for the reaction 10) to the air positive electrodes 6. In addition, in one embodiment, a pump is used to supply a constant flow of electrolyte 12 through each of the fuel cells 1. Examples of a system comprising these components are shown in FIG. 4.

Figure 4:
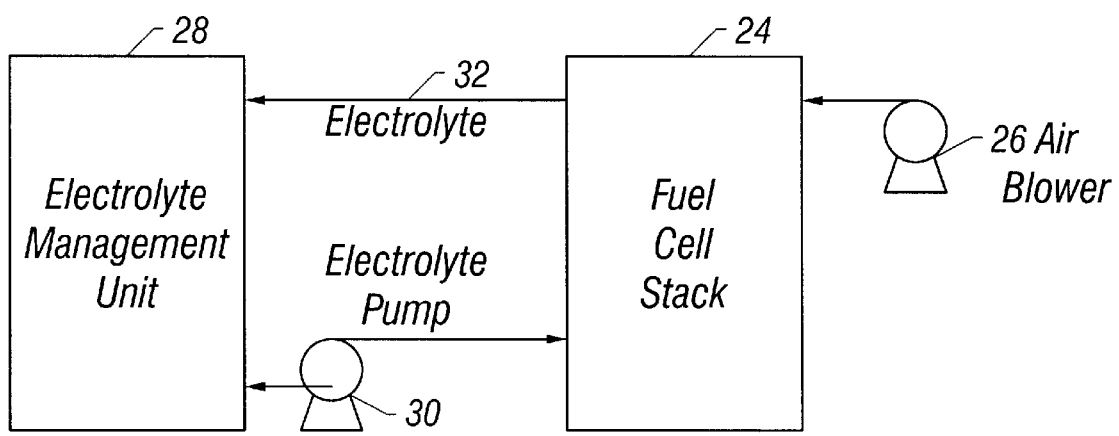
FIG. 4 is an example of a fuel cell system that shows an air blower and electrolyte pump in accordance with one embodiment of the present invention.

FIG. 4 is an example of a fuel cell system that includes an air blower 26 and electrolyte pump 27, in accordance with one embodiment of the present invention. As shown, an air blower 26 is coupled with the fuel cell stack 24. The air blower 26 supplies a constant flow of ambient air comprising oxygen through the positive electrodes 6 to facilitate the reaction 10. Similarly, an electrolyte pump 27 is used to supply the fuel cell stack 24 with a constant supply of electrolyte 12. An important aspect of the fuel cell 1 is that the bed of zinc particles 2 in each cell 1 is continually washed by a flow of re-circulating electrolyte 12. This removes the soluble zinc reaction product zincate, and therefore reduces precipitation of discharge products in the electrode active area. In addition, the circulation of electrolyte 12 removes unwanted heat and helps to prevent the cells 1 from overheating. As shown, an electrolyte management unit 28 is used to remove the zincate and/or heat from the electrolyte so that the same electrolyte can be re-circulated through the fuel stack 24.

Figure 5:
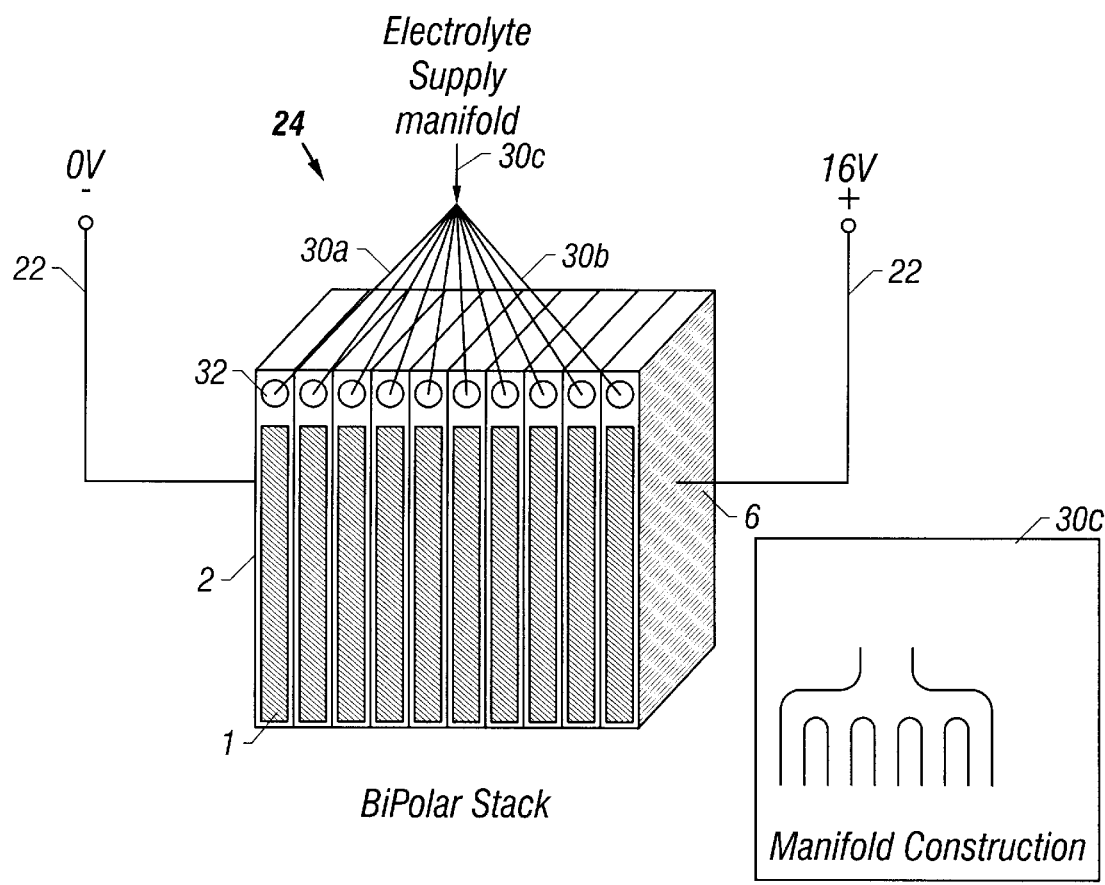
FIG. 5 is a block diagram that depicts a simplified view of a manifold device used to supply a flow of electrolyte through each fuel cell in a fuel cell stack, according to one embodiment of the present invention.

FIG. 5 is a block diagram that depicts a simplified view of a manifold device 30 that is used to supply the flow of electrolyte 12 through each of the cells 1 in the fuel cell stack 24. Note that a similar manifold device (not shown) is used to remove an equal amount of electrolyte 12 from each cell 1. In one embodiment, the second manifold is coupled with the cell stack at the rear bottom portion of the cell stack 24. Typically, the electrolyte 12 is constantly pumped through each cell 1 during active operation of the bipolar stack 24. A close-up view depicting a more accurate example showing the construction of a typical manifold device 30 is shown as reference numeral 30c.

A problem is encountered due to the fact that the manifold 30 is connected to each cell 1 in the stack 24 during operation. The electrolyte 12 is an ionic conductor of electricity. Consequently, when the manifold 30 is coupled with the fuel cell stack 24 in the manner shown in FIG. 4, and electrolyte is flowing therein, a short circuit exists. This can be seen by noting, for example, that the manifold port 30a is connected to a portion of the fuel cell that is at 0V, while the manifold port 30b is connected to a portion of the fuel cell that is at 14V. This voltage differential causes the negative OH⁻ ions to travel through the manifold 30 toward the higher potentials (in this example, from left to right). A consequence of this short is unwanted heat dissipation and an overall power reduction in the fuel cell stack 24.

This problem can be reduced to negligible values by increasing the resistance of the short circuit path caused by the manifold 30. In one embodiment, this is accomplished by making the manifold 30 as long and thin as possible. When this is done, the electrical resistance in the manifold is increased substantially and the power dissipation is thereby decreased to acceptable levels.

However, a second problem is encountered as a consequence of the required electrolyte connection and the associated short circuit through the manifold 30. This problem is described below with reference to FIGS. 6 and 7.

Figure 6:
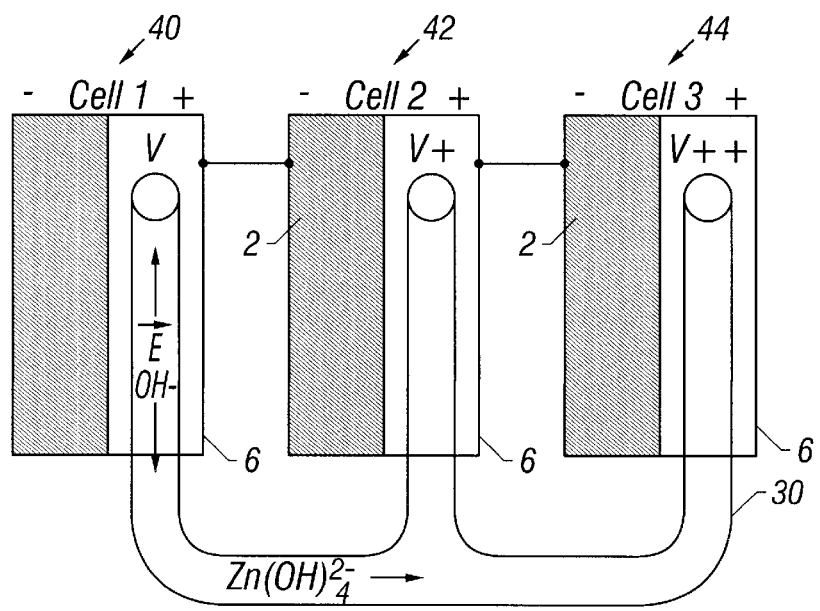
FIG. 6 is a block diagram depicting a simplified view of three fuel cells connected in series, according to one embodiment of the present invention.

FIG. 6 is a block diagram depicting a simplified view of three cells 1 connected in series. This figure is useful for describing the source of the short circuit, as described above. As shown, cell 1 (40) is electrically connected to cell 2 (42). Likewise, cell 2 is electrically connected to cell 3 (44). A manifold 30 is coupled to each of the cells in parallel as shown. In this example, as shown, the potential of each cell increases from left to right.

Accordingly, as shown, the component of the electric field along the axis of the manifold branch 30a connected to cell 1 is pointing toward cell 1, causing the hydroxyl ions to travel in the opposite direction of the electric field toward the higher potential in cells 2 and 3. As stated above, this short circuit reduces the overall power of the cell stack, but can be reduced to acceptable levels by decreasing the diameter and increasing the length of the manifold 30. However, it has been determined that another, much more serious problem is encountered. This problem is related to the formation of zinc dendrites within the manifold.

Specifically, the presence of an increasing electric field at the zinc/electrolyte interface causes the formation of zinc dendrites in the manifold 30. These zinc dendrites can grow to form a continuous link throughout the entire manifold and cause a catastrophic short circuit.

Figure 7:
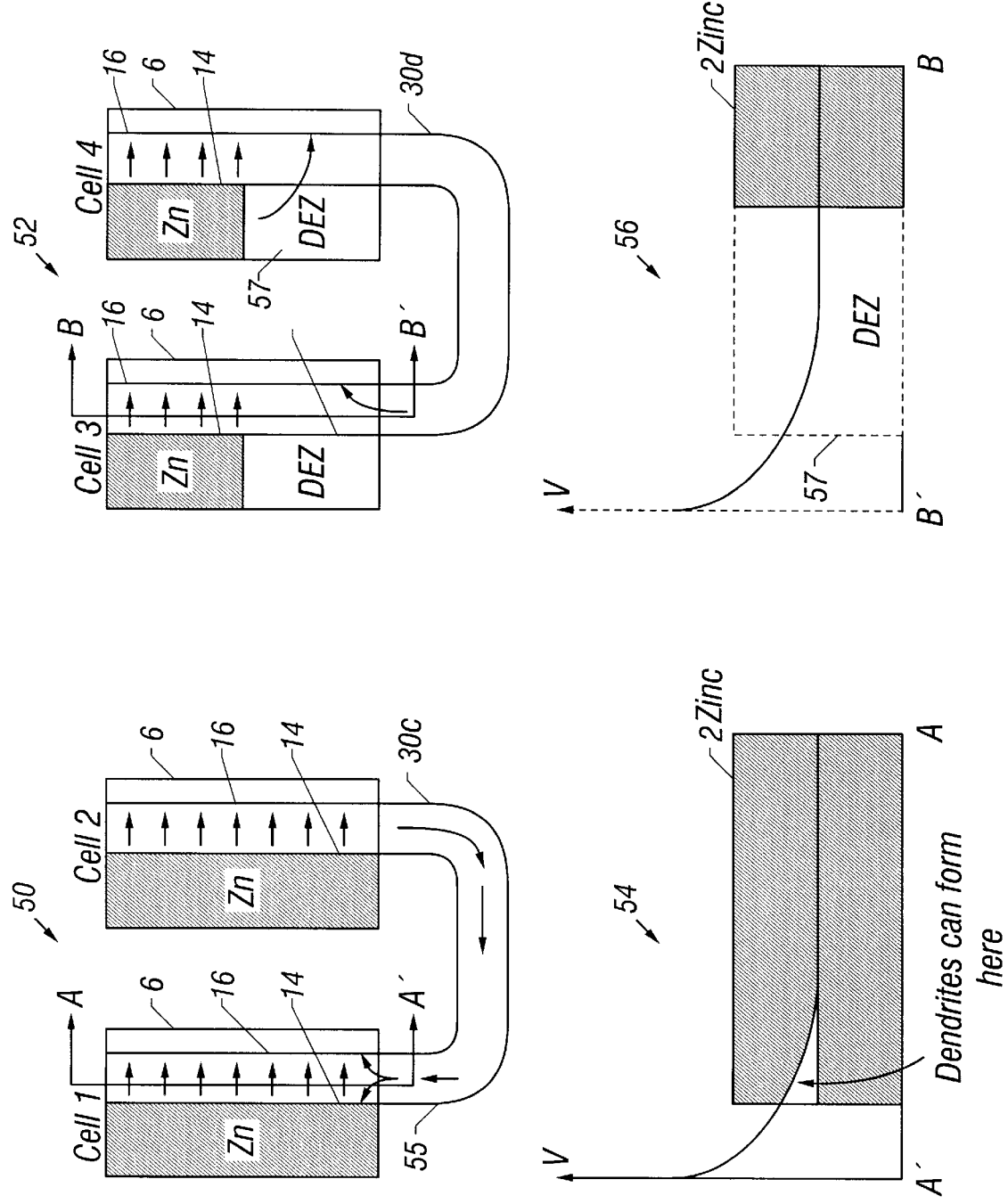
FIG. 7 is a block diagram depicting the formation of zinc dendrites and a solution to the dendrite problem, according to one embodiment of the present invention.

FIG. 7 is a block diagram that depicts the formation of zinc dendrites 55 and a solution to the dendrite problem. As described below, the solution includes a dendrite elimination zone that is used to eliminate the formation of dendrites in accordance with one embodiment of the present invention.

FIG. 7 depicts a top view of two cell stacks 50 and 52. It should be noted that the cell stacks 50 and 52 depict only two cells for simplicity. Referring now to cell stack 50, cells 1 and 2 are coupled by an electrolyte manifold 30c for delivering electrolyte 12 to each cell during operation. As shown, the electric field in each of the cells 1 and 2 extends to the right in the bulk of the electrolyte separating the air positive electrode 6 and the zinc negative electrode between interface 14 and 16. This electric field is due to the ohmic voltage drop across the electrolyte associated with ionic current flow as shown in FIG. 2.

Note that in the area within the manifold, the shunt current caused by the higher potential of the cells to the right has two possible paths. Upon entering the cell, the shunt current can flow directly through the cell separator (not shown) to the air positive electrode 6, or it can flow into the nearby surface of the zinc electrode 2 and then from the zinc electrode to the air electrode. It is this latter path that leads to zinc dendrites 55 because the current flow into the zinc electrode entails a cathodic reaction that deposits zinc. This cathodic reaction is reaction 8, but in reverse. Note that this reaction can occur at the zinc surface or at the surface of any electronic conductor in contact with the zinc negative electrode.

Recall that for a single cell, such as cell 2, zinc is oxidized at the zinc negative electrode 2 (reaction 8). The corresponding reduction reaction takes place when oxygen is reduced at the air positive electrode 6 (reaction 10).

However, when cell 1 and cell 2 are connected together, the following reactions occur. First, zinc is still oxidized at the zinc negative electrode 2 in cell 2. However, the corresponding reduction reaction is not only the oxygen being reduced at the air positive electrode 6 at cell 2, but a small amount of oxygen is reduced at the air positive electrode 6 in cell 1 and a small amount of zinc is reduced at the zinc negative electrode in cell 1. This last reaction is reaction 8 in reverse and is precisely the same reaction that is used to recover zinc from the electrolyte in one type of zinc recovery operation. This substitution reaction is the cause of the zinc dendrites 55.

The substitution reaction occurs due the presence of an electric field as shown, pointing into the zinc negative electrode in cell 1 in the electrolyte at the zinc surface. Referring now to the graph 54, a schematic graph of the electric potential corresponding to the A–A' cutaway view in the cell stack 50 is shown. Note that the potential increases moving away from the zinc surface, (i.e. the electric field points into the zinc surface). It is noted that for the substitution reaction to take place, two conditions must be present: the availability of electrons (from a metal, such as zinc); and the presence of an electric field pointing towards the metal near its surface in the electrolyte. A third condition, which is generally always satisfied, is the presence of zincate in the electrolyte to supply the zinc for the dendrite to grow.

Accordingly, as shown in graph 54, the area in which these conditions occur is the precise area in which dendrites are formed.

The cell stack 52 depicts a solution to this problem in accordance with one embodiment of the present invention. In particular, a dendrite elimination zone (DEZ) 57 is constructed to prevent dendrites from forming. The DEZ 57 is a zone characterized by the substantial lack of zinc particles from the negative electrode 2 in the region where the electric field is pointing towards the zinc, and the substantial presence of the positive electrode through this region or adjacent to this region and extending away from the zinc negative electrode. In one implementation, zinc particles are removed at a point where the electrolyte manifold 30 enters and exits the fuel cell 1. Alternatively, the air positive electrode 6 may be extended into the electrolyte manifold 30.

Thus, by creating a sufficient dendrite elimination zone 57 around the manifold 30 entrances and exits, dendrites 55 are prevented from forming. As shown, by the shunt current entering cell 3, oxygen is reduced at the air positive electrode 6, but zinc is not reduced at the negative electrode 2 due to the lack of zinc and the unavailability of electrons in this area.

Referring now to the schematic graph 56, the electric potential corresponding to the B–B' cutaway view in the fuel stack 52 is shown. Note that the electric potential is steady in the region where the zinc is present. Thus, dendrites will not form in this area. The dendrite elimination zone 57 is represented by the dotted lines.

Figure 8:
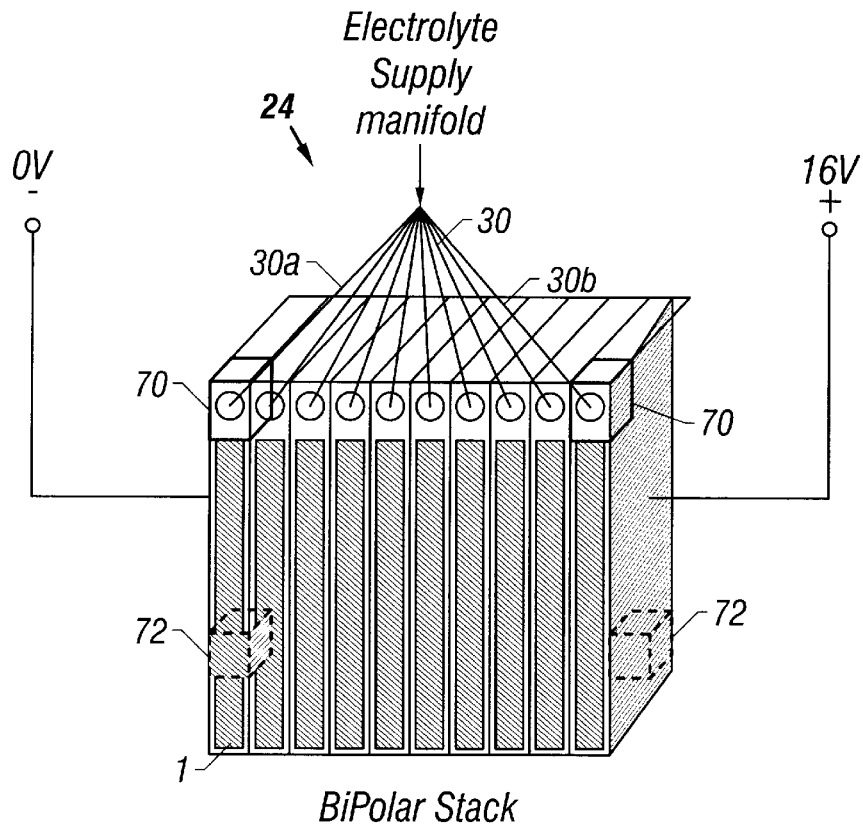
FIG. 8 is a block diagram depicting a fuel cell with the dendrite elimination zones 70 and 72 installed, in accordance with one embodiment of the present invention.

FIG. 8 is a block diagram depicting a fuel cell with the dendrite elimination zones 70 and 72 installed, in accordance with one embodiment of the present invention. Note that for simplicity, the dendrite elimination zones are only shown in the first and last cell of the stack 24. It is important to note that each of the cells includes two dendrite elimination zones 70 and 72. Accordingly, as shown, a dendrite elimination zone 70 and 72 is constructed in the regions where the manifold 30 enters and exits each fuel cell 1. The exit manifold is not shown in this example.

In one embodiment, nylon screens are used to construct a box type structure that forms the dendrite elimination zones 70 and 72. The dimensions used for the DEZs 70 and 72 depend on the geometry and electrochemical characteristics of the cells 1 used in each particular embodiment of the present invention.

The following is an example of calculations that could be performed to determine the size and shape of an optimal dendrite elimination zone (DEZ). Note that this is just one example that is particular to a specific embodiment of a zinc/air fuel cell 1 manufactured by Metallic Power, Inc. of Carlsbad, Calif. However, by reading this example, it would be apparent to persons skilled in the relevant art(s), how to perform similar calculations and simulations for other fuel cells, batteries, and/or fuel cell recovery systems having different geometric, electrical and chemical configurations.

The following example is a description of a series of calculations accomplished with the finite element software "FIDAP" manufactured by Fluent Corporation of Lebanon, NH. to determine conditions under which this dendrite elimination (DEZ) area would be effective. It was concluded that a 20 mm by 20 mm area should be effective under all practical circumstances.

It should be noted that the DEZ need not be cuboid or any particular shape, and it can be located partially or entirely in the manifold adjacent to the cell.

This dendrite elimination zone (DEZ) was installed in the corner of the zinc negative electrode 2 at the point where the electrolyte conduit 30 enters the cell. As shown above, dendrites 55 tend to form in this vicinity due to shunt current flowing along the conduit from adjacent cells. On entering the cell there are two possible paths for the shunt current: it can flow directly through the cell electrolyte and separator to the air positive electrode 6, or it can flow into the nearby surface of the bed of zinc particles 2 and then from the bed through the separator to the air electrode 6.

It is this latter path that leads to zinc dendrites 55 because the current flow into the zinc bed 2 entails a cathodic reaction (i.e. reaction 8 in reverse) that deposits zinc. The purpose of the calculations was to determine conditions under which this current flow into the zinc could be avoided.

Figure 9:
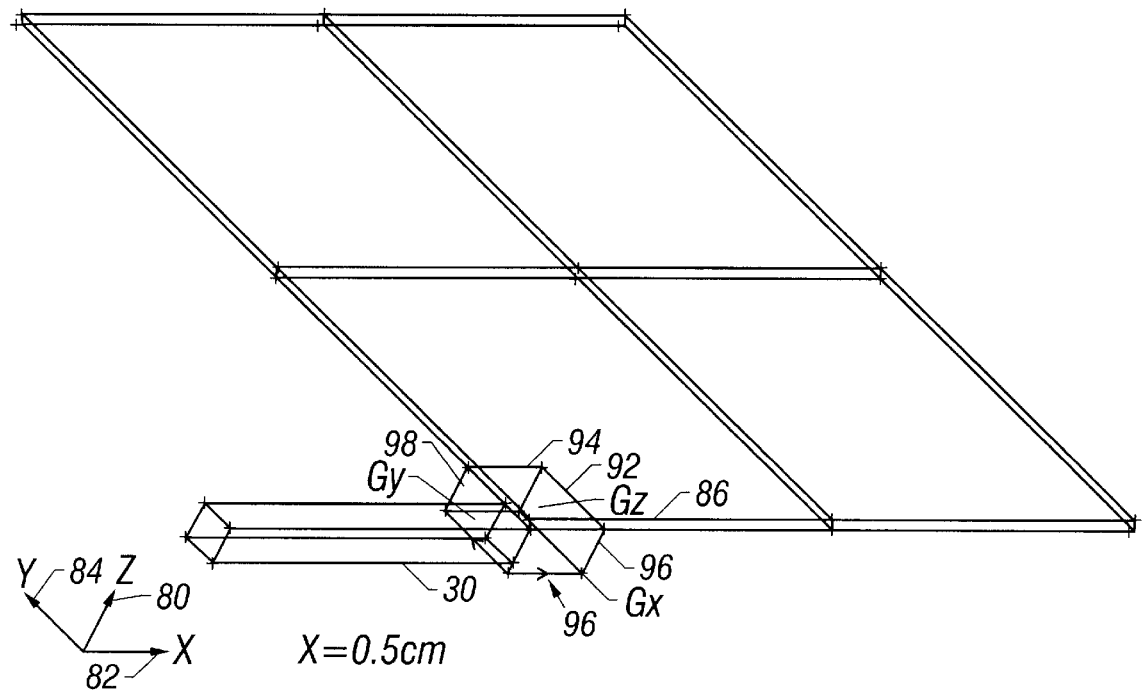
FIGS. 9–21 are results from an example report used to describe typical calculations that can be performed for determining an optimal geometry for dendrite elimination zones in a fuel cell, according to one embodiment of the present invention.

The calculations are ones which determine the distribution of current and potential in the three dimensional volume of one cell 1. FIG. 9 shows the geometry employed in the calculations for this example. When looking at this figure it is best to think of the z direction 80 as being upwards with the x direction 82 and y direction 84 pointing somewhat away from the observer. The true upward direction when the cell is in an operating position is the minus y direction.

The observer's view is from above the cell turned on its side with the separator 86 on top. The conduit 30 bringing electrolyte (and shunt currents) to the cell is the long cuboid structure, as shown. The DEZ 90 is seen as the small cuboid at the rightmost end of the conduit 30. Two of the vertical walls 92 and 94 of the DEZ 90 are surfaces of the zinc bed, one vertical wall 96 is the top (physically) of the cell and the last vertical wall 98 is partly the mouth of the conduit 30 and partly the side of the cell. The large plate-like volume (broken up into four sub-volumes in this figure) is the separator (containing electrolyte) 86. The calculations below determine the distribution of current and potential in these volumes.

Electrochemists think of such distributions as "primary," "secondary" and "tertiary" distributions. The first is the distribution that results when reaction kinetics and mass transport play no role, but rather the distribution is determined solely by conduction in the electrolyte 12. Kinetics are added in secondary distributions and mass transport in tertiary distributions. The calculations carried out below have been of the primary distribution. The calculations then entail solving Laplace's equation in the three volumes: conduit 30; DEZ 90; and separator 86.

The calculations make allowance for the fact that the electrolyte conductivity in the separator 86 may be less than that of the electrolyte 12 in the DEZ 90. Furthermore, to avoid having an inconveniently long and skinny conduit 30 (the actual dimensions are 5 mm by 3.4 mm by 250 mm in this example) in the calculations, its geometry was set to that shown in FIG. 9 (i.e. 2 mm by 2 mm by 20 mm long).

Further, the conductivity of the electrolyte 12 is adjusted so that the resistance of the conduit 30 is that of the actual conduit. The calculated solutions satisfy the requirement that the current density is continuous across the boundaries between the volumes. Because it is only potential gradients that have physical significance, the potential can be arbitrarily set to any value. In this example, a choice was made to set potential to zero in the electrolyte on the air side of the separator. The potential in the electrolyte at the left (far) end of the conduit was set to 1.

Laplace's equation is a linear equation; consequently the potential and current distribution simply change by a factor of 10 if the potential at the end of the conduit is increased by a factor of 10. The same is true for any other factor and therefore the choice of 1, for this potential, yields results for all other potentials by simple multiplication. The potential at the electrolyte at the zinc surfaces 94 and 92 bounding the DEZ 90 was assumed uniform and was varied in the calculations. This was the principal parameter that was varied, the other being the size (in the y and x directions) of the DEZ 90. Calculations were carried out for DEZs that were 5 mm by 5 mm and for DEZs 20 mm by 20 mm.

The actual computations were done using the software FIDAP. This software is intended for solving problems in fluid flow, heat and mass transport in complicated 3D geometry. It is commonly used to solve heat conduction problems but rarely used for calculation of electrical conduction in electrochemical cells. Fortunately both are equivalent because they entail the solution of Laplace's equation with analogous boundary conditions.

The potential in the electrical conduction case becomes the temperature in the heat conduction case and the current density in the former becomes the heat flux in the latter. The only untidy aspect of the calculations is that the plots that are the output from FIDAP have legends etc. that contain "temperature" and "heat flux."

The Results

Figure 10:
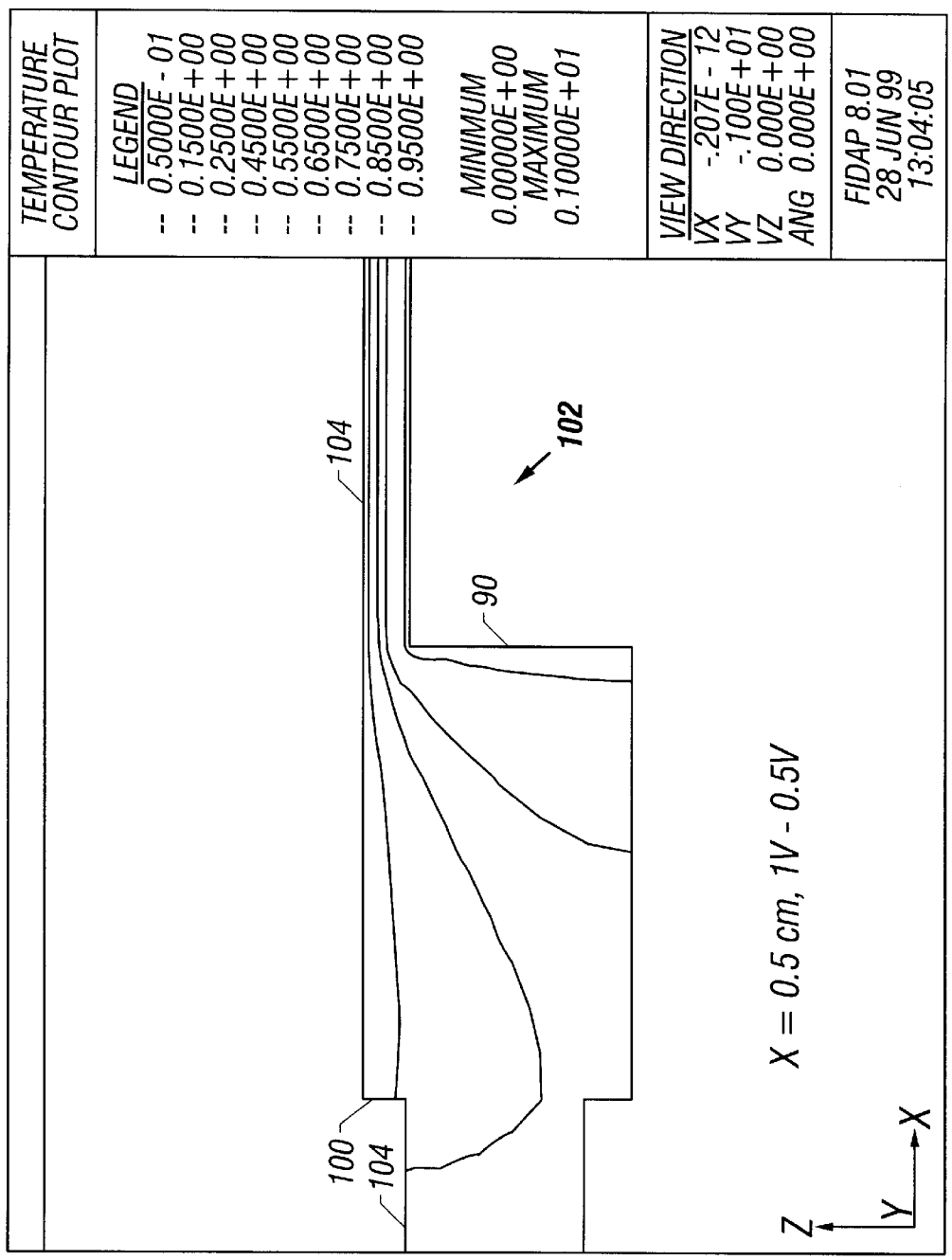

FIG. 10 shows the computed potential distribution for the case of a 5 mm by 5 mm DEZ 90. Despite the label that refers to temperatures, it is potential contours that are displayed in FIG. 10. The results are for a plane passing through the axis of the conduit 30 and parallel to the x-z plane. The DEZ 90 is a little to the left of center and the end 100 of the conduit 30 is on the far left. On the right is the gap 102, occupied by the separator, between the zinc bed and the air electrode. The separator also extends across the top 104 of the DEZ 90 and the potential on the upper surface of this separator is the (arbitrary) zero.

The far left 104 of the conduit is at potential 1 and the potential of the electrolyte at the zinc surface has been set to 0.5 in this calculation. This is the potential at the right side of the DEZ. Current flows down the gradient of potential (along the electric field) and the contours of potential in this figure mean that current flow and electric field at the zinc surface is away from the zinc, i.e., the reaction at the zinc surface is anodic, rather than cathodic, and dendrites should not form. A shunt current flows out of the conduit (the potential gradient is downward exiting the mouth) but none of this current reaches the zinc.

Figure 11:
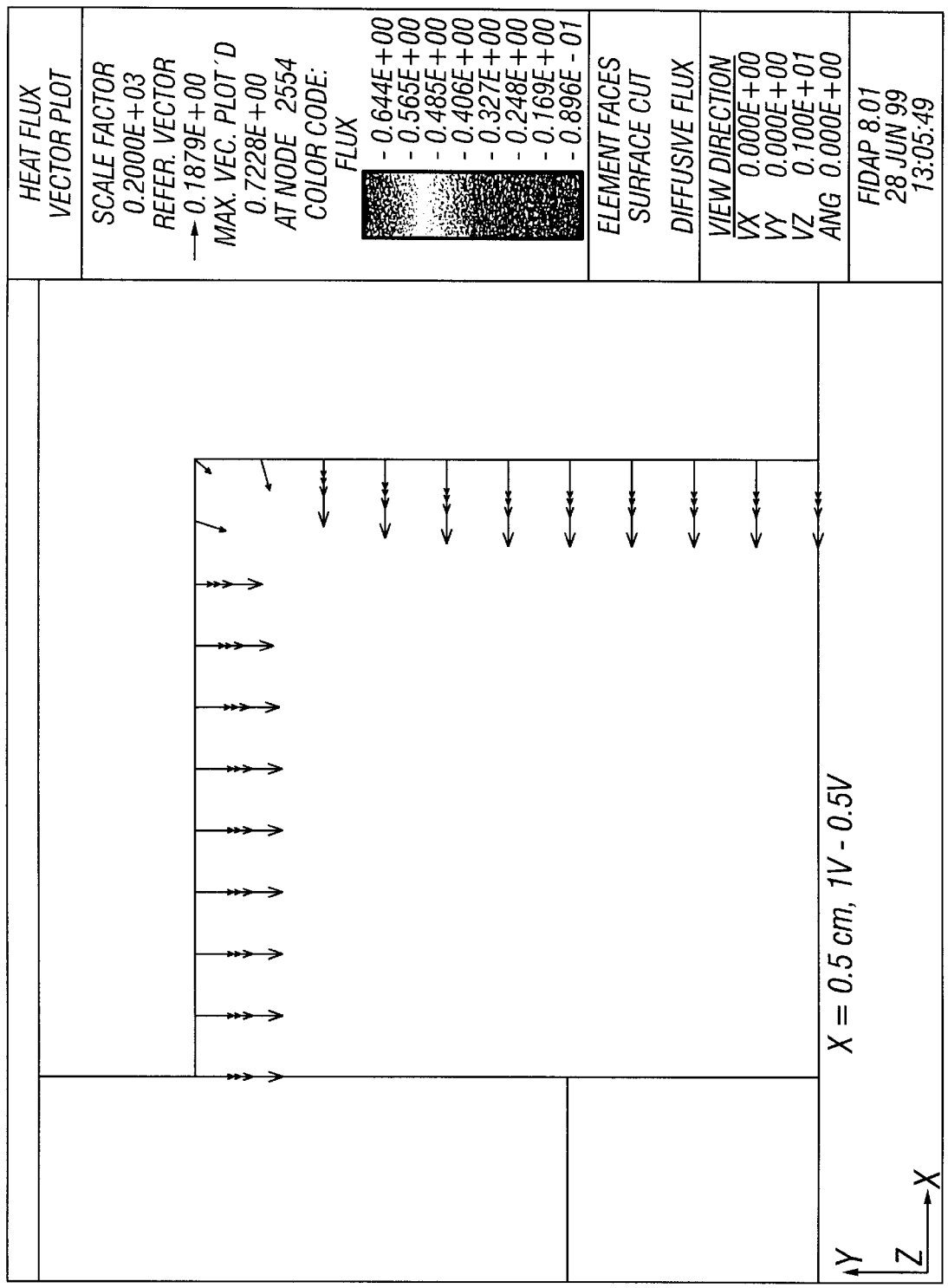

FIG. 11 is a plot of results for a view perpendicular to that of FIG. 10, for the same conditions. This is a view parallel to the z direction. In normal (operating) position the top of the cell would be the bottom of this figure. Again the conduit is on the left and the DEZ is nearly centered. The arrows indicate the direction of current flow on the zinc surface (top and right of the DEZ). The length of the arrow indicates the magnitude of the current density at that point. Several arrowheads are visible at each arrow because the computer shows all the arrows (at various z positions). The important result, in conformity with that of FIG. 10, is that none of the arrows point into the zinc.

For the calculations yielding the results of FIGS. 10 and 11, a value of 0.5 was used for the potential of the electrolyte in the DEZ at the surface of the zinc bed. Intuitively, as the potential of the zinc surface is lowered there must be some point at which current starts to flow into that surface. For example if the electrolyte at the zinc surface is at zero potential, then it is at the same potential as the air side of the separator and current will flow into it just as easily as into the separator.

Figure 12:
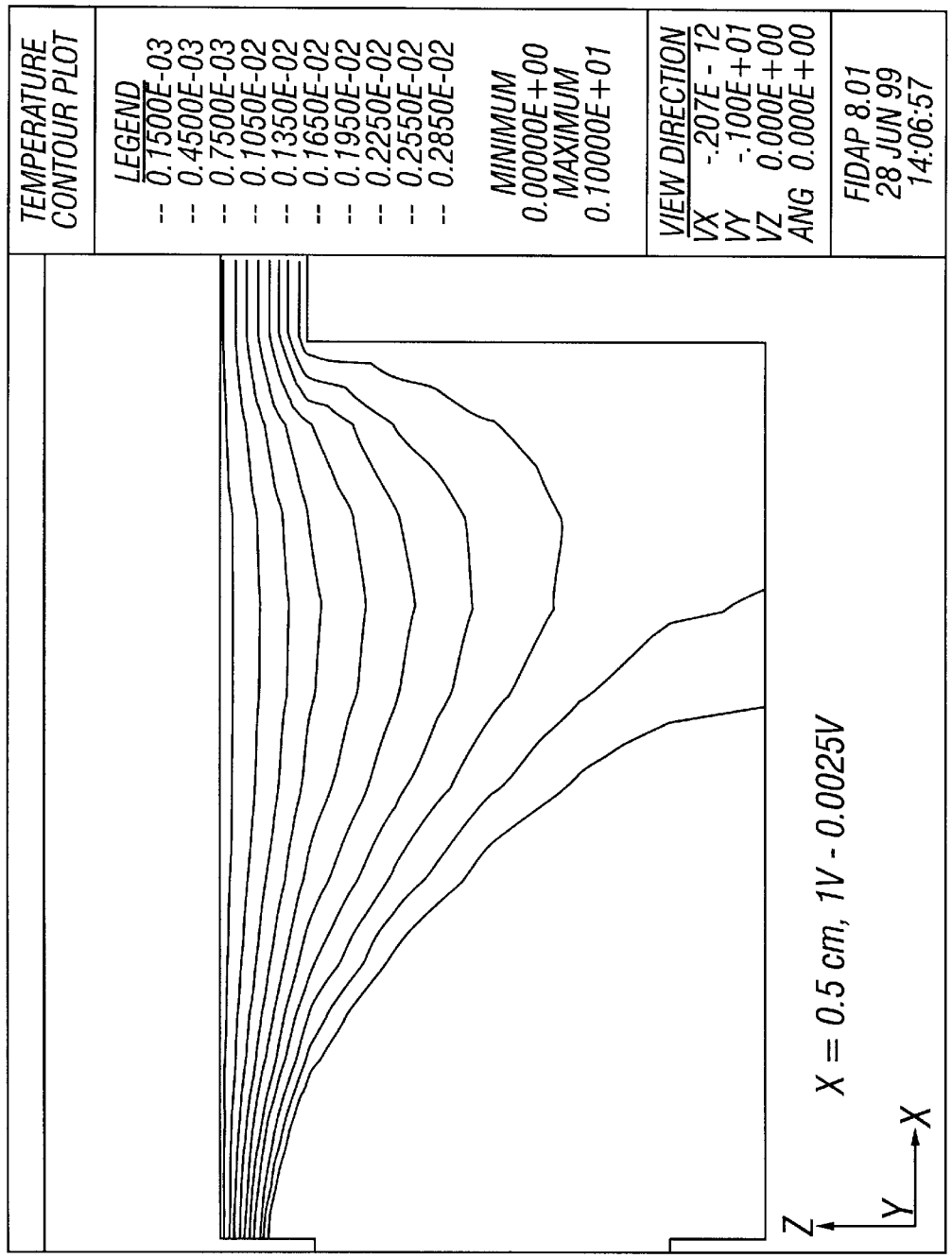

Accordingly, a series of calculations were carried out in which the potential of the electrolyte at the zinc surface was gradually reduced, first to 0.1, then to 0.05, then to 0.003 and 0.0025. FIG. 12 shows the results for 0.0025; the viewpoint is that of FIG. 10 except that the scale is somewhat enlarged. Inspection of the contours reveals that the potential gradient is still downwards moving away from the zinc surface, i.e., current flow is away from the zinc. This is confirmed in FIG. 13, which has the same viewpoint as FIG. 11 where all the currents are flowing out of the zinc into the DEZ.

Figure 13:
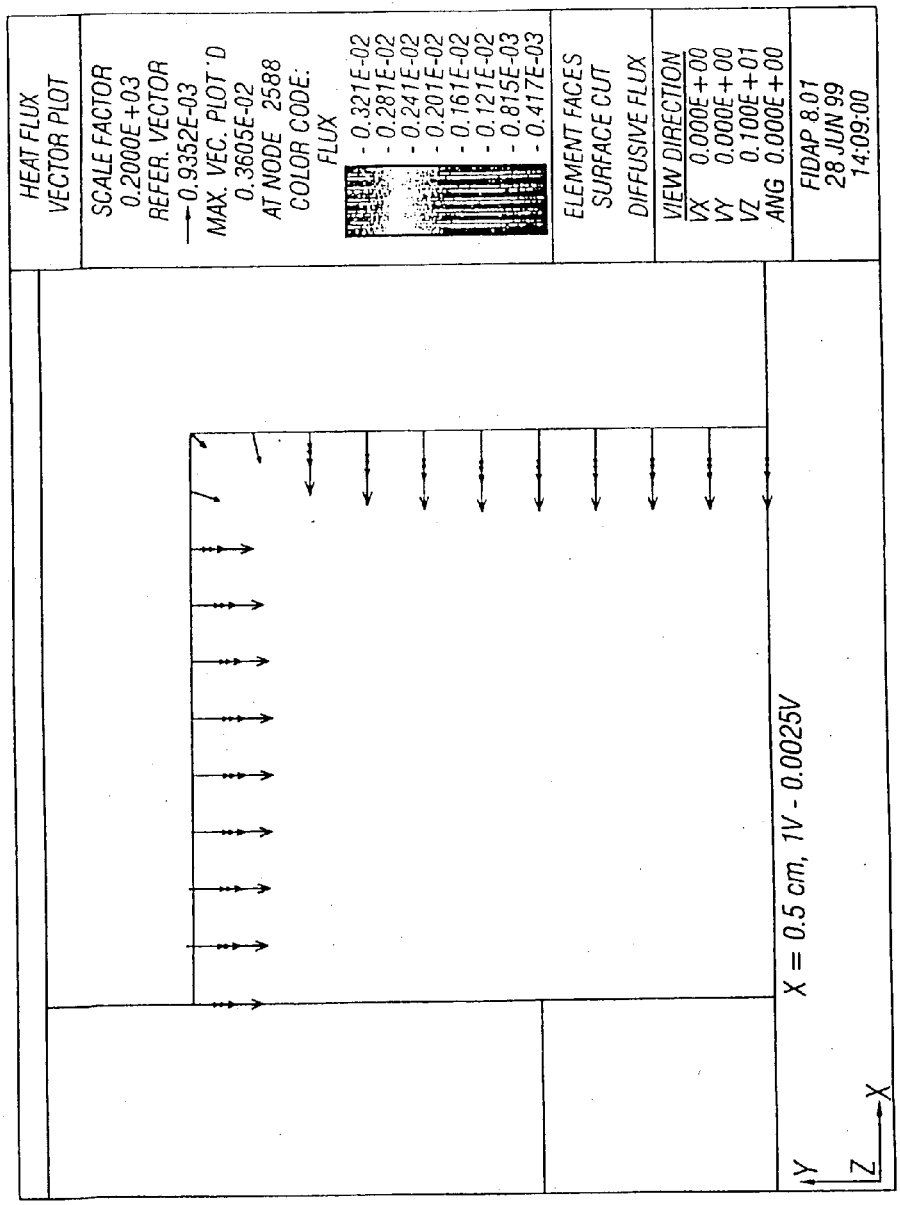
Figure 14:
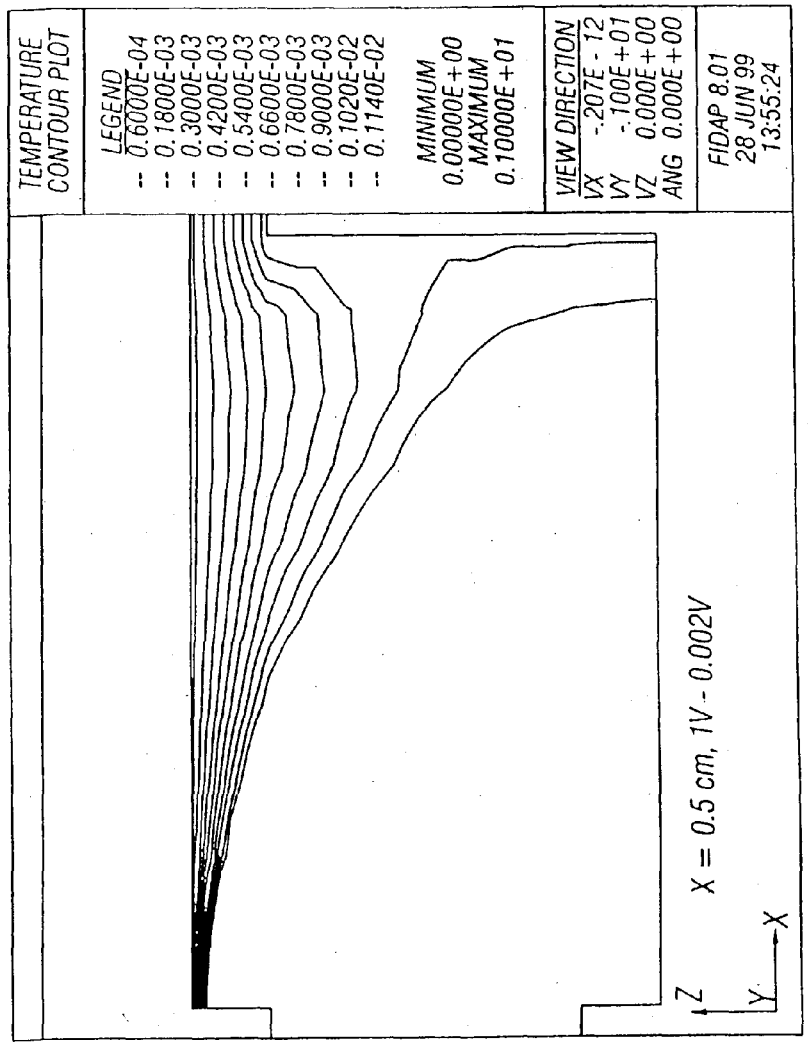
Figure 15:
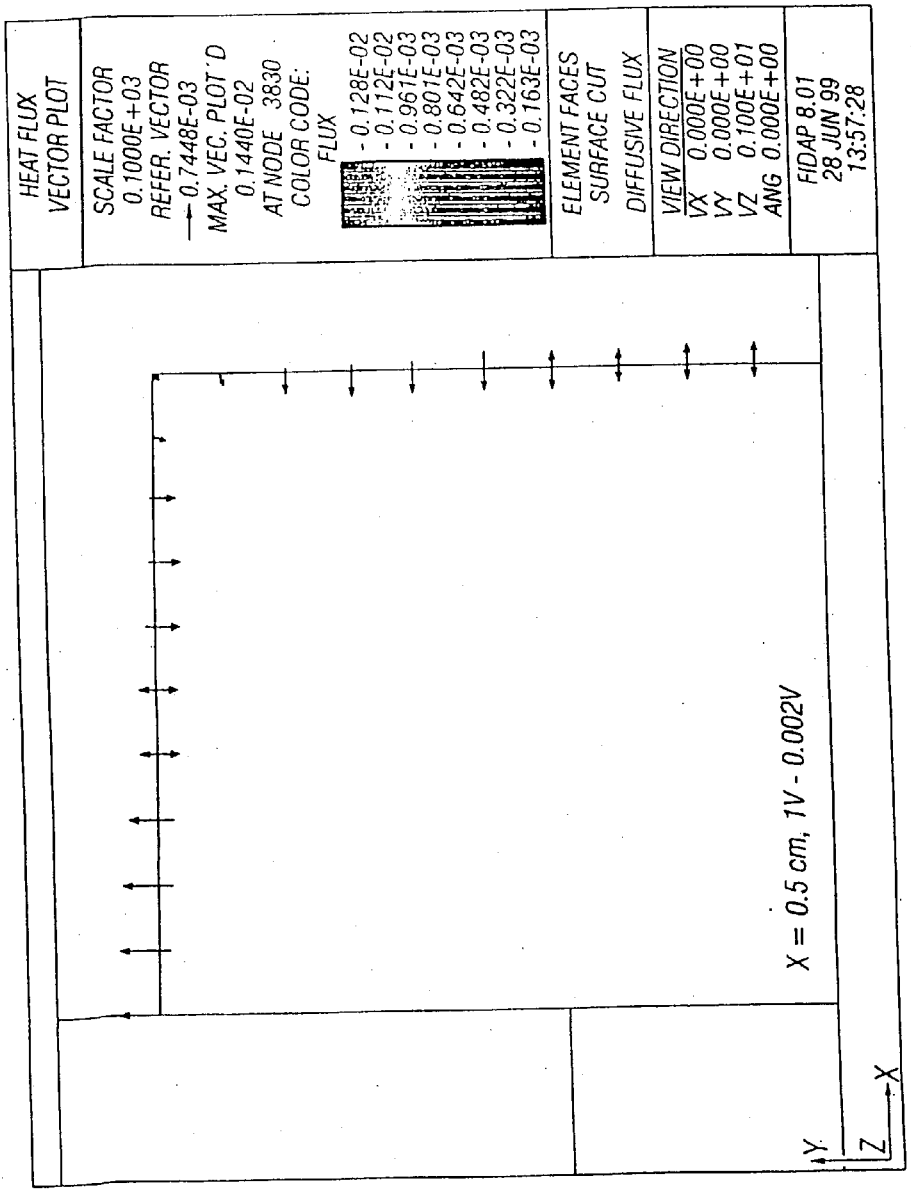
Figure 16:
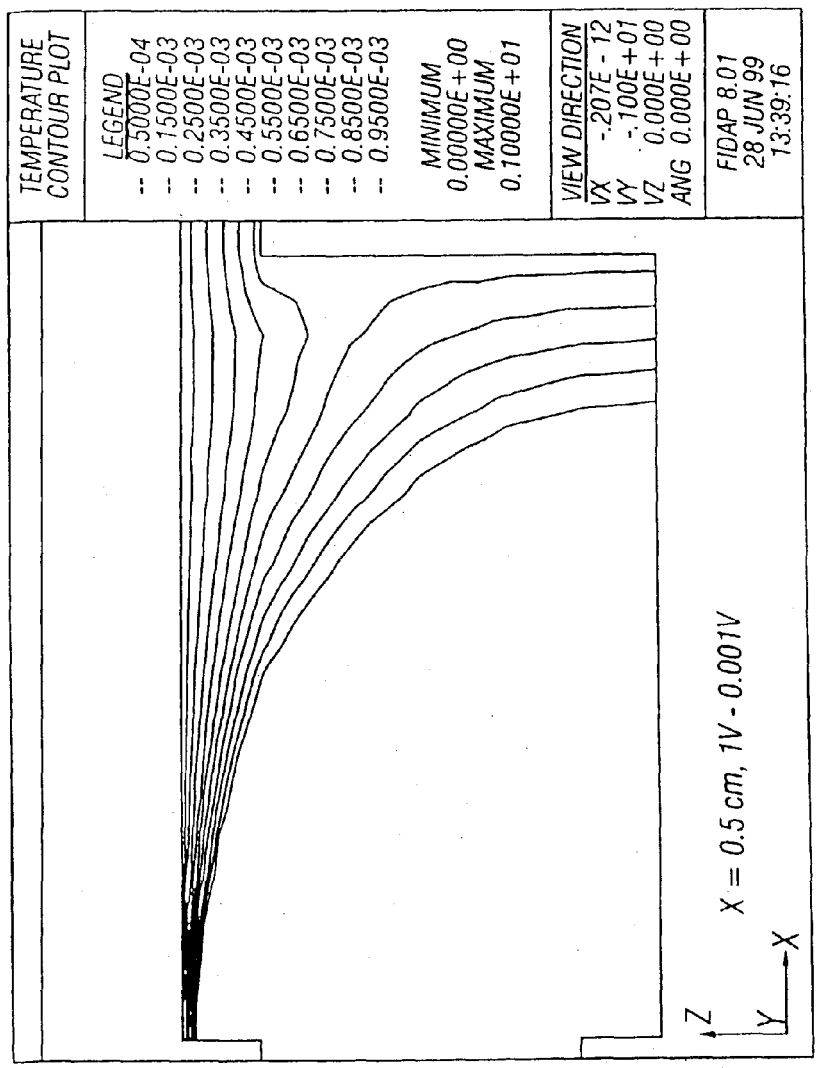
Figure 17:
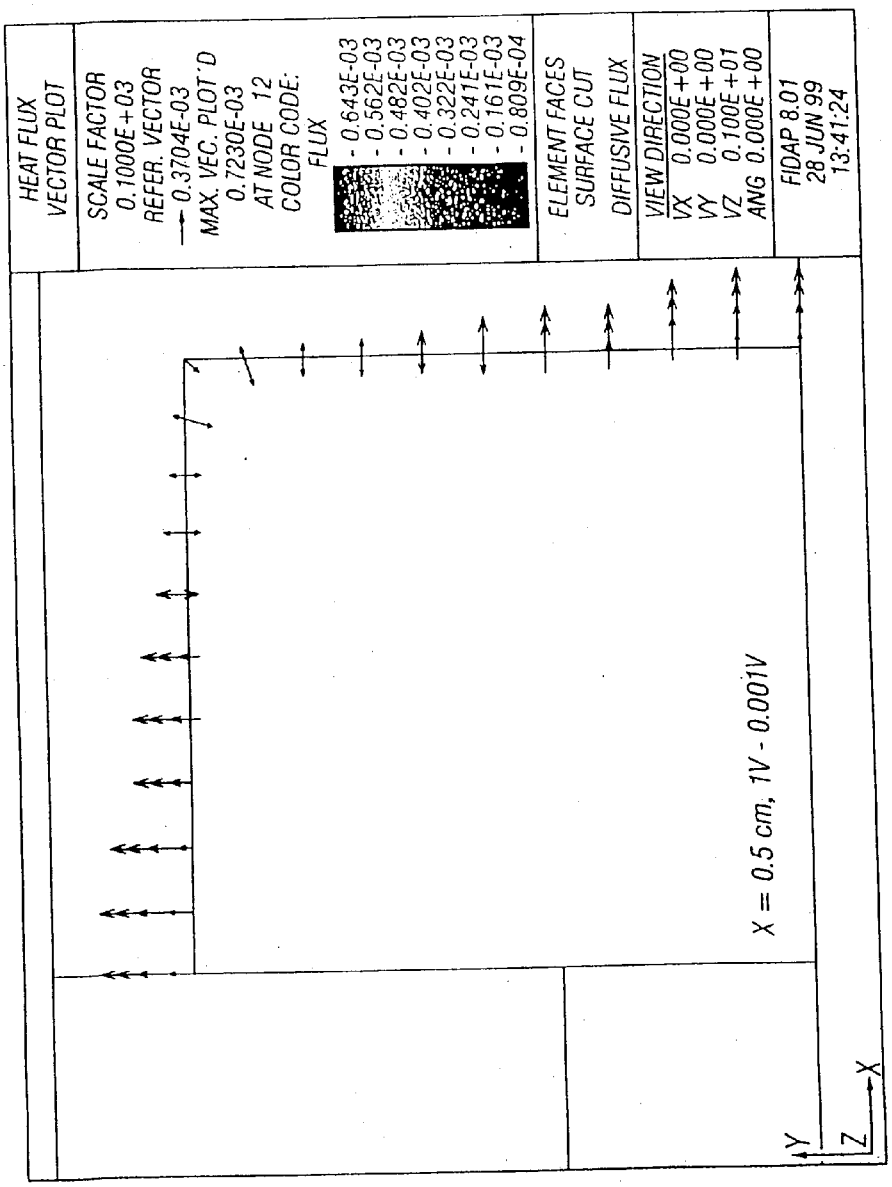
Figure 18:
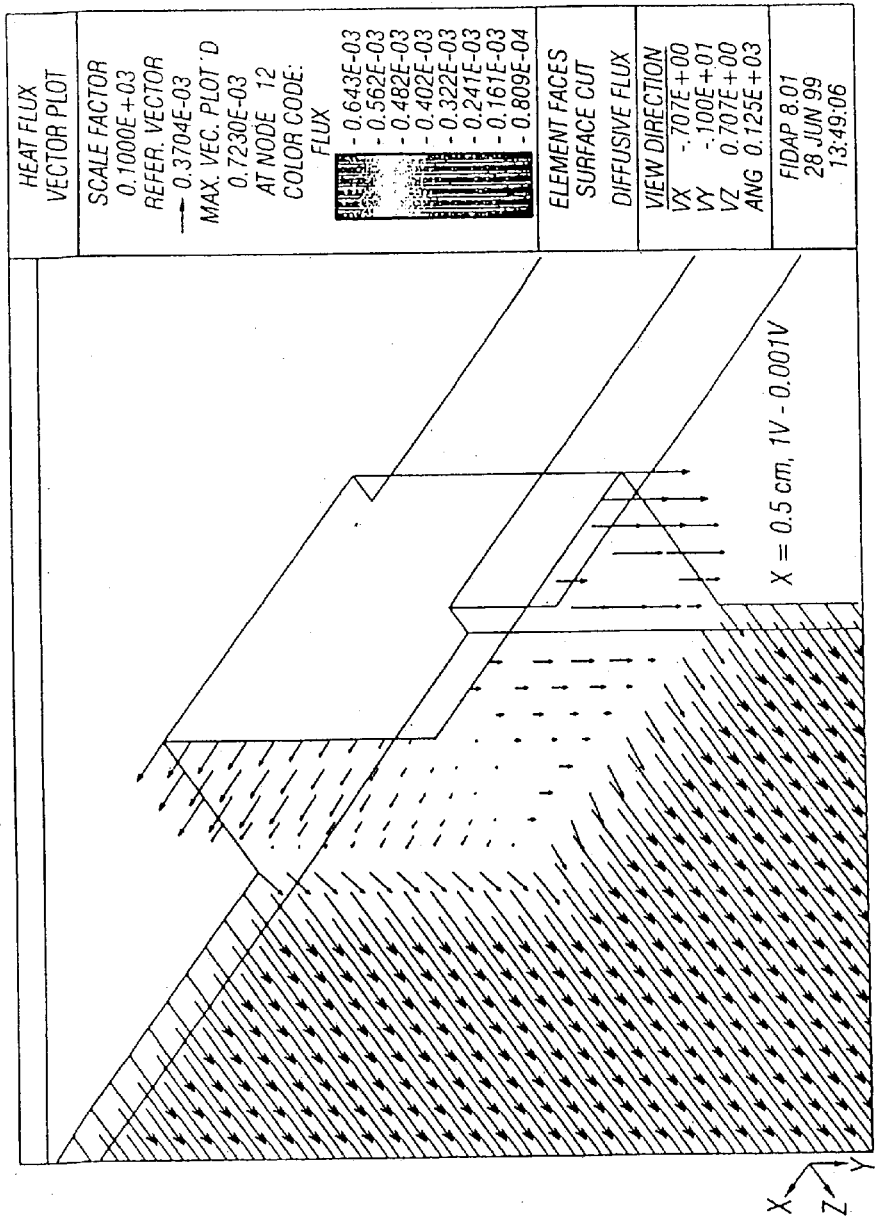
Figure 19:
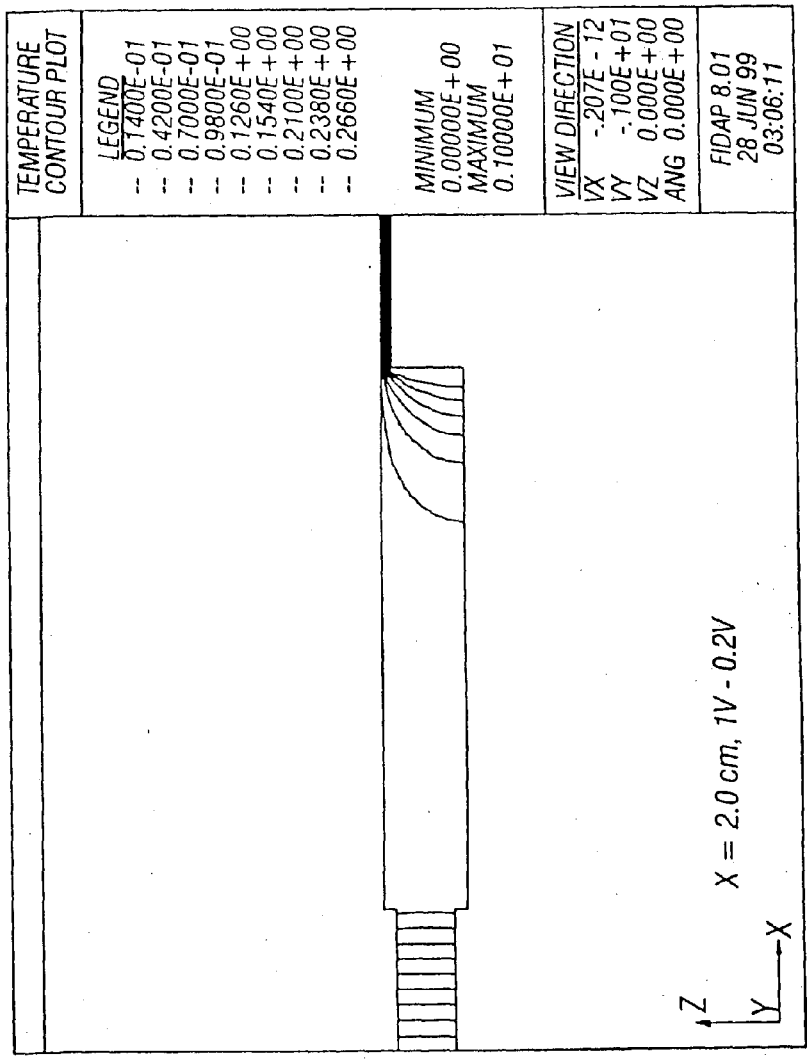
Figure 20:
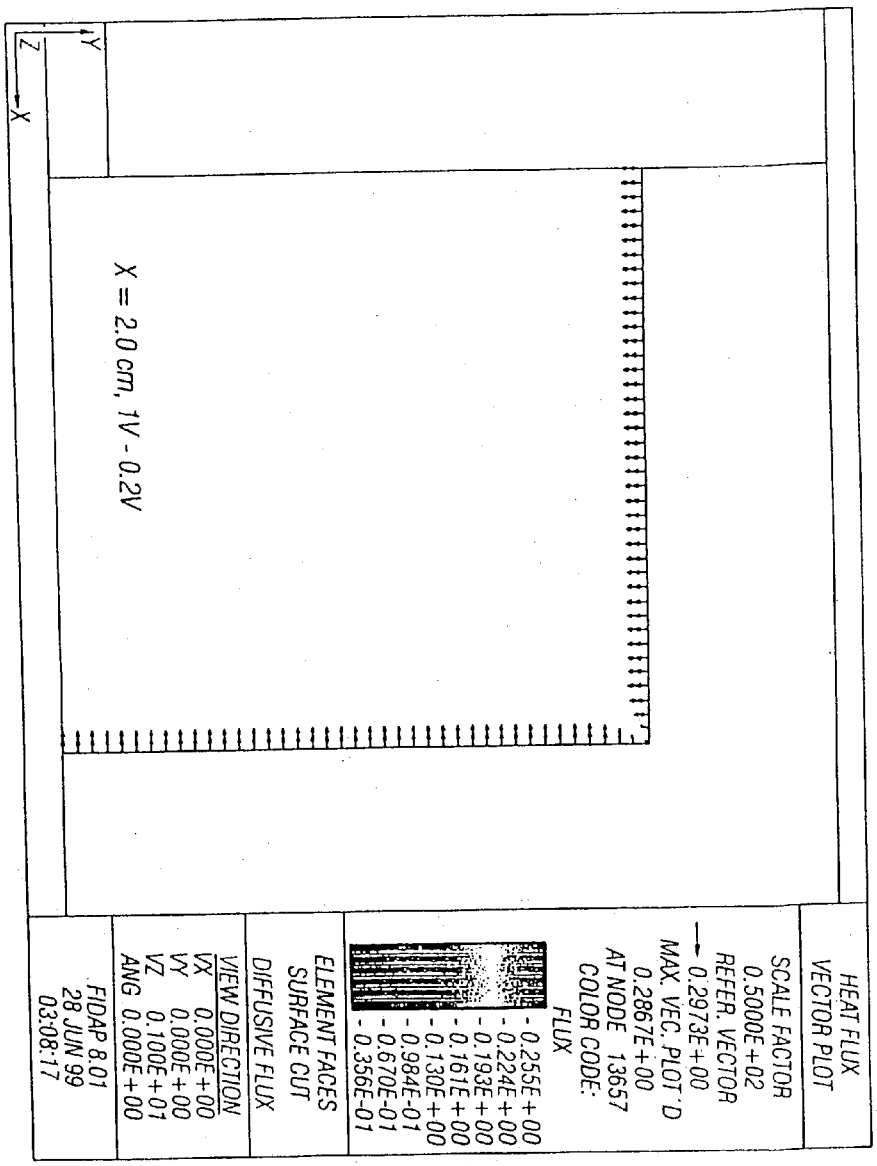
Figure 21:
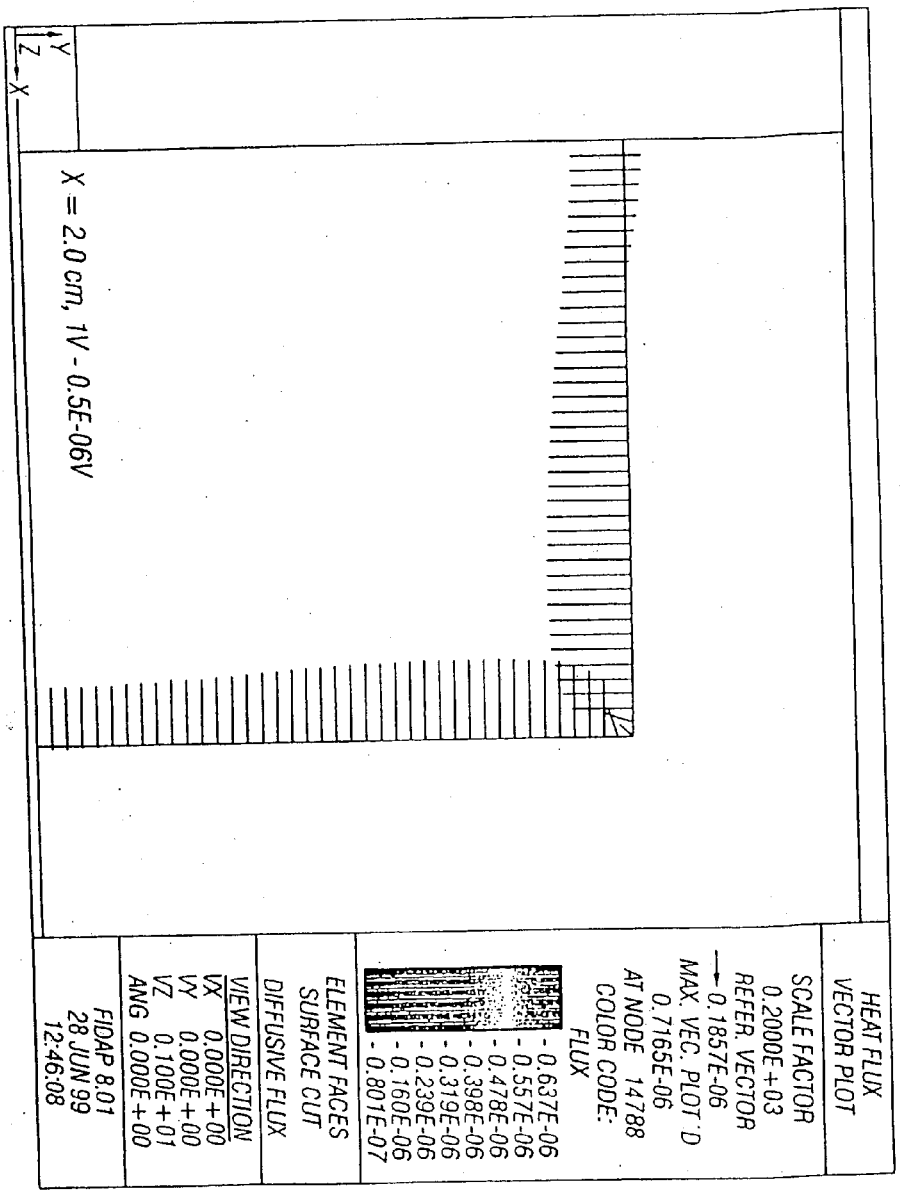

Note however that the magnitudes of the currents are substantially less in FIG. 13 than FIG. 11; the magnitudes can be discerned from the arrow lengths in comparison to the reference vector length on the upper right.

Figure 14:
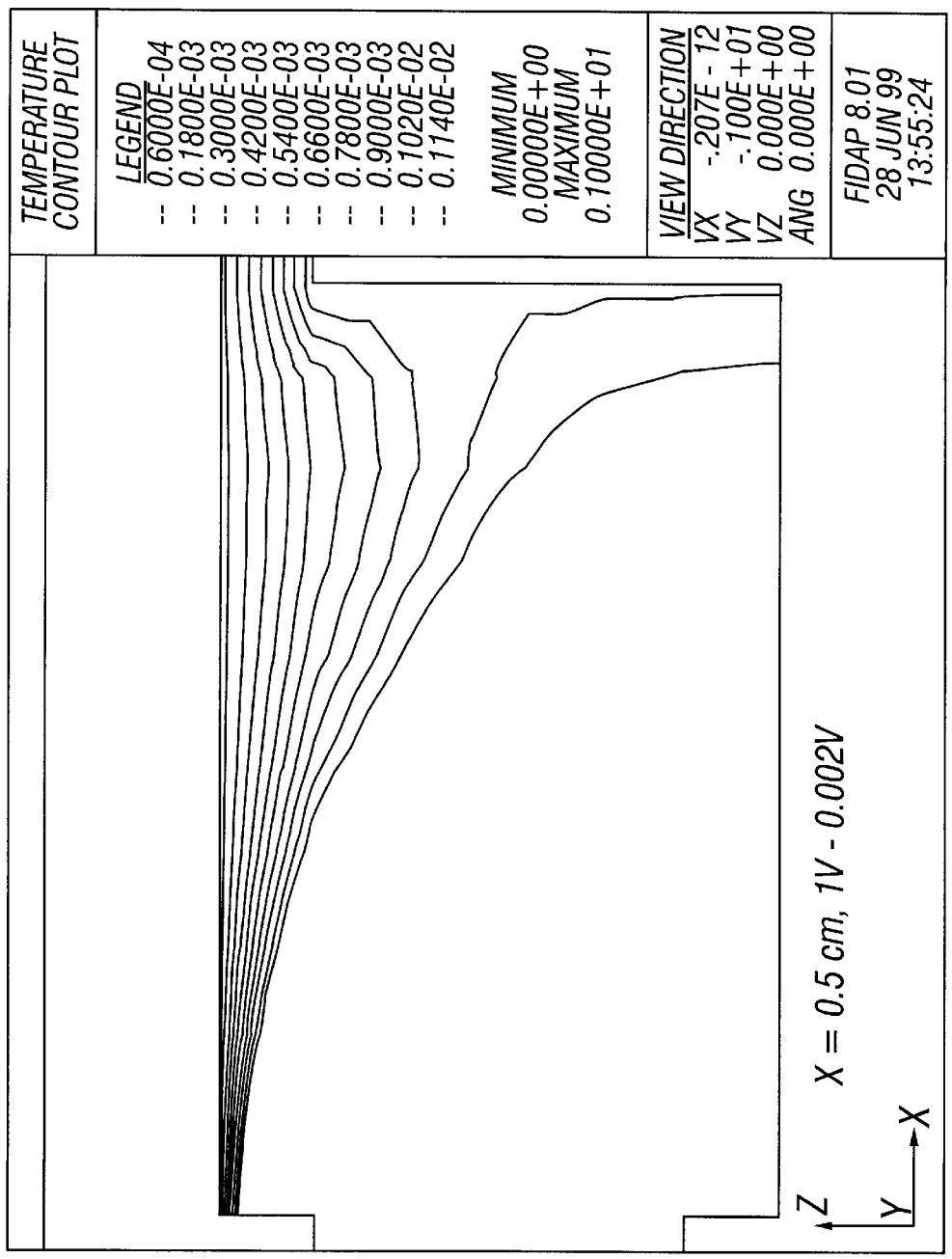
Figure 15:
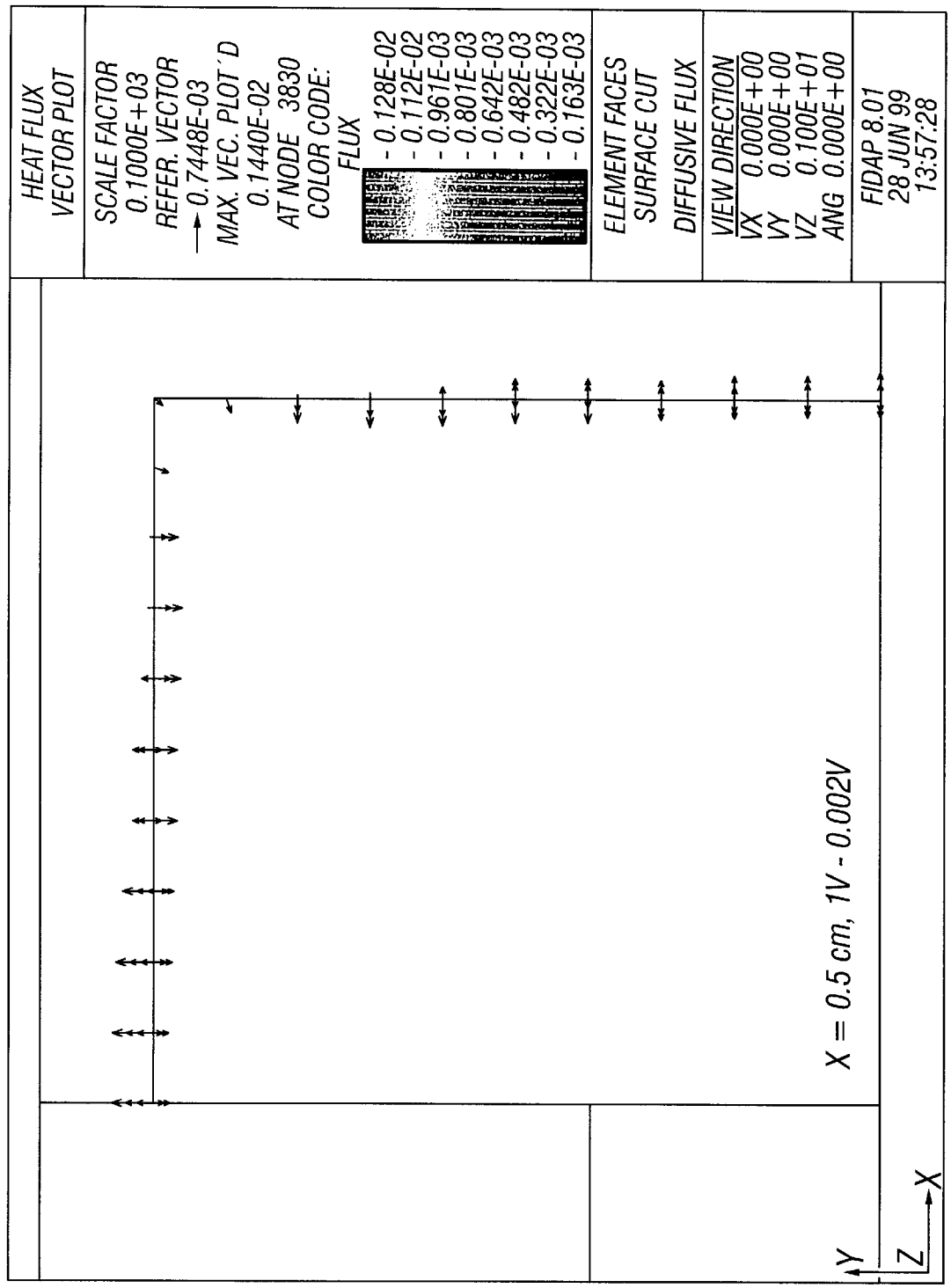

The electrolyte potential at the zinc surface has been further reduced to 0.002 in FIGS. 14 and 15. Inspection of FIG. 14 shows that now the down slope of the potential is into the zinc near the bottom on the figure. This is confirmed in FIG. 15 where the arrowheads are pointing into the zinc surface.

Figure 16:
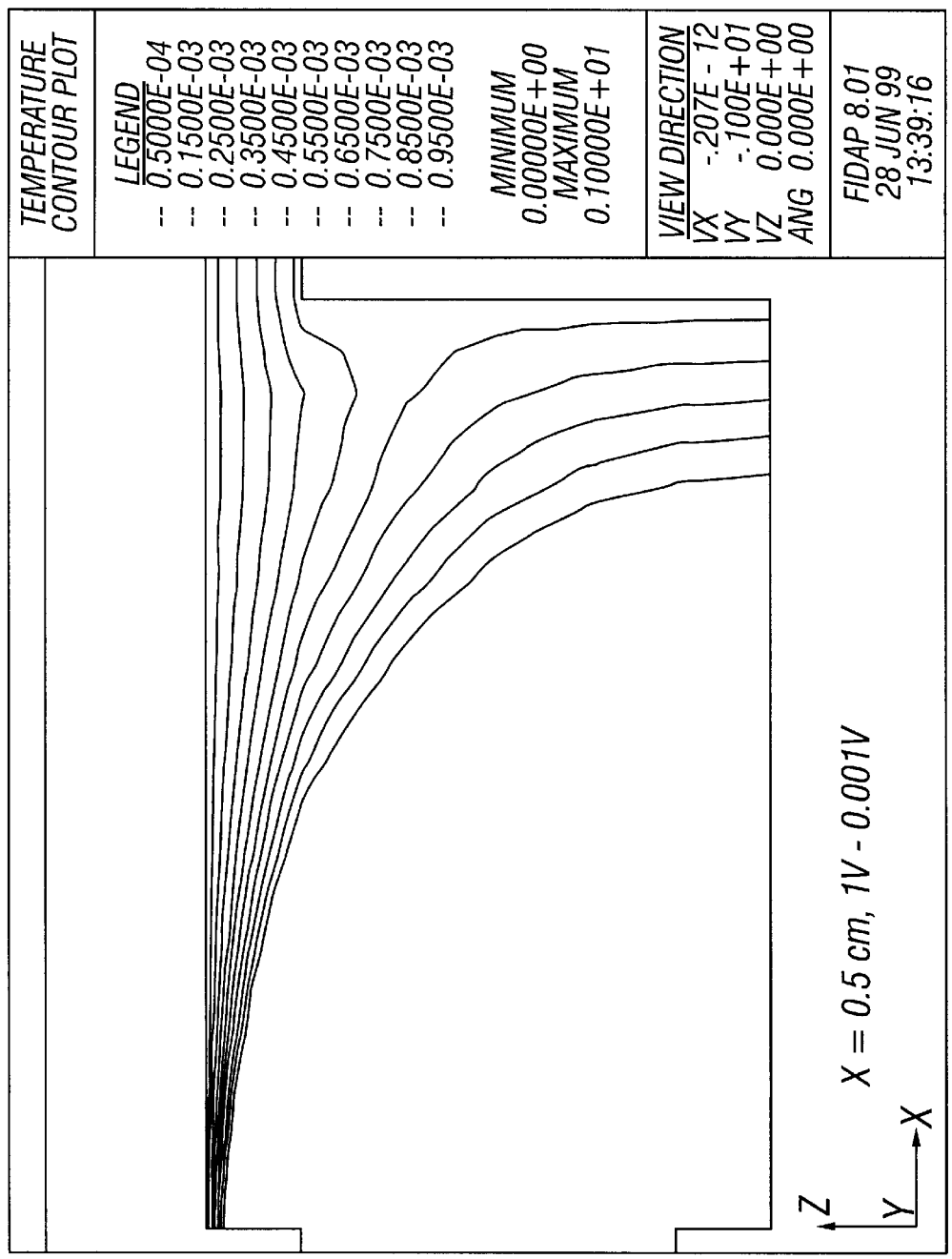
Figure 17:
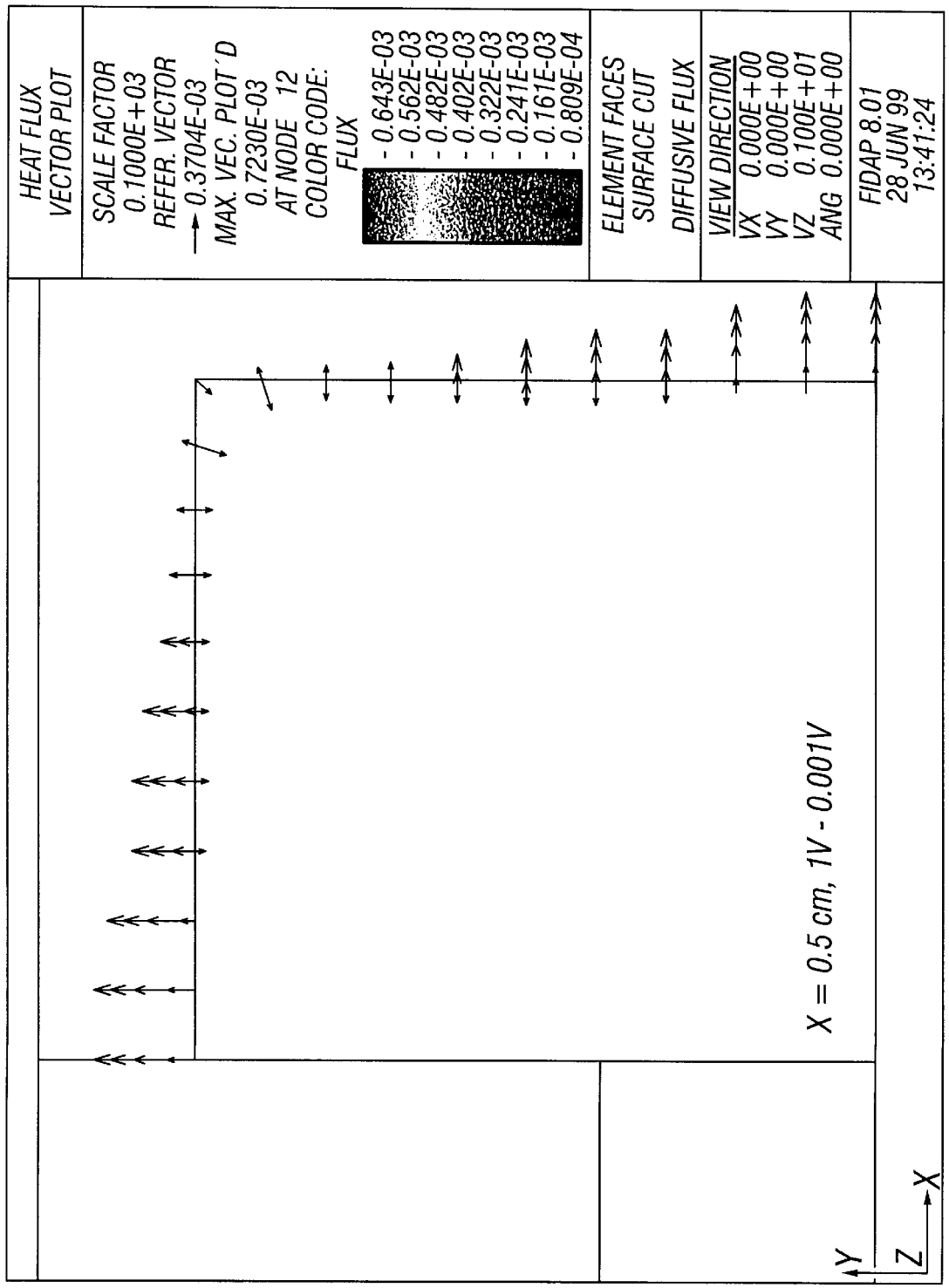

From these results, it can be seen that somewhere between 0.0025 and 0.002, the potential at the zinc surface becomes low enough that shunt currents can start to cause dendrites on the zinc surface. When the potential at the zinc surface is even lower at 0.001, FIGS. 16 and 17, the current flow into the zinc is predominantly into the surface. Another view of the current distribution on the zinc surfaces (including the surface up against the separator 86) appears as FIG. 18. Dendrite producing currents are largest on parts of the zinc surface that are furthest from the separator and closest to the conduit mouth.

Figure 18:
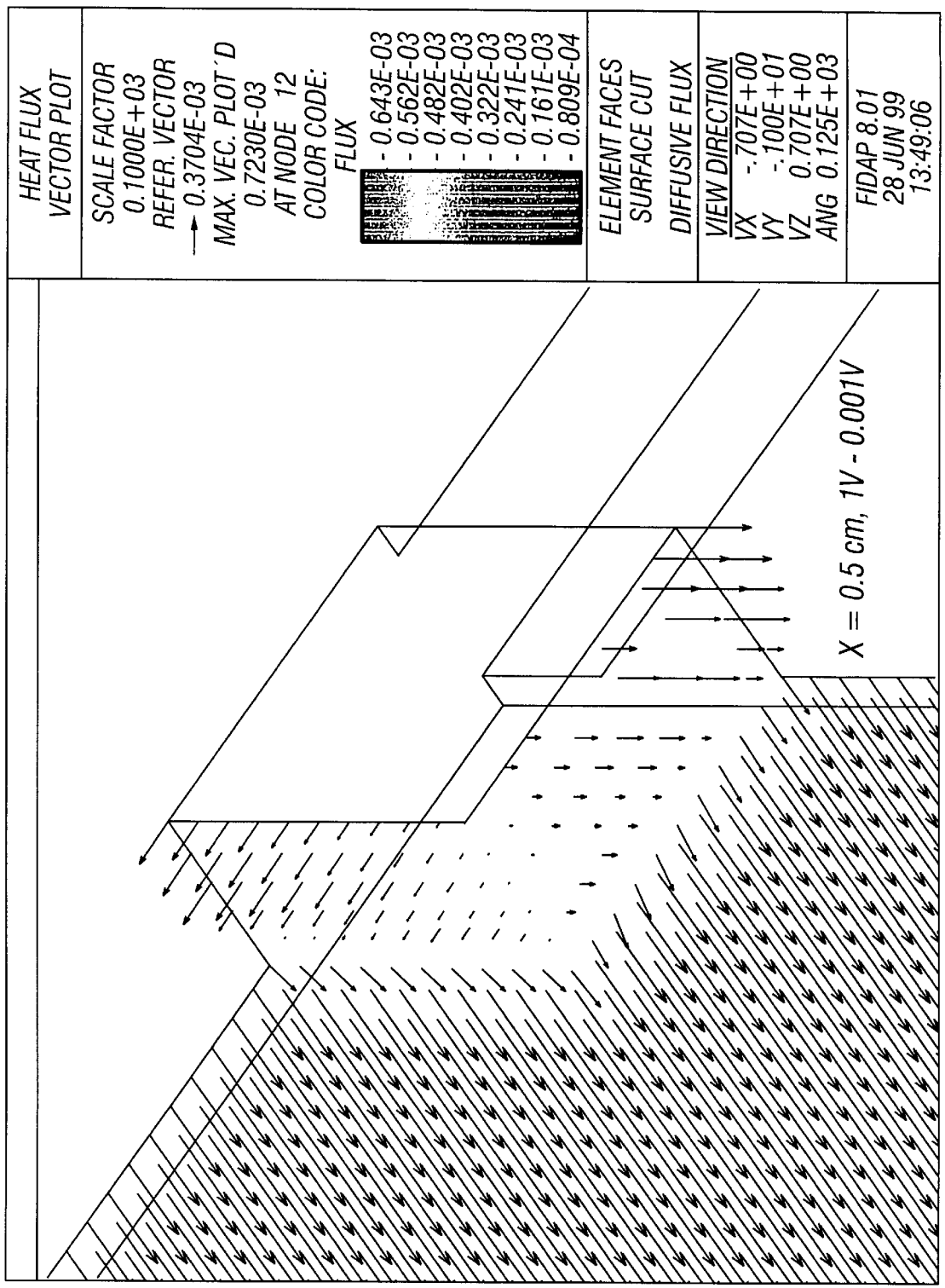
Figure 19:
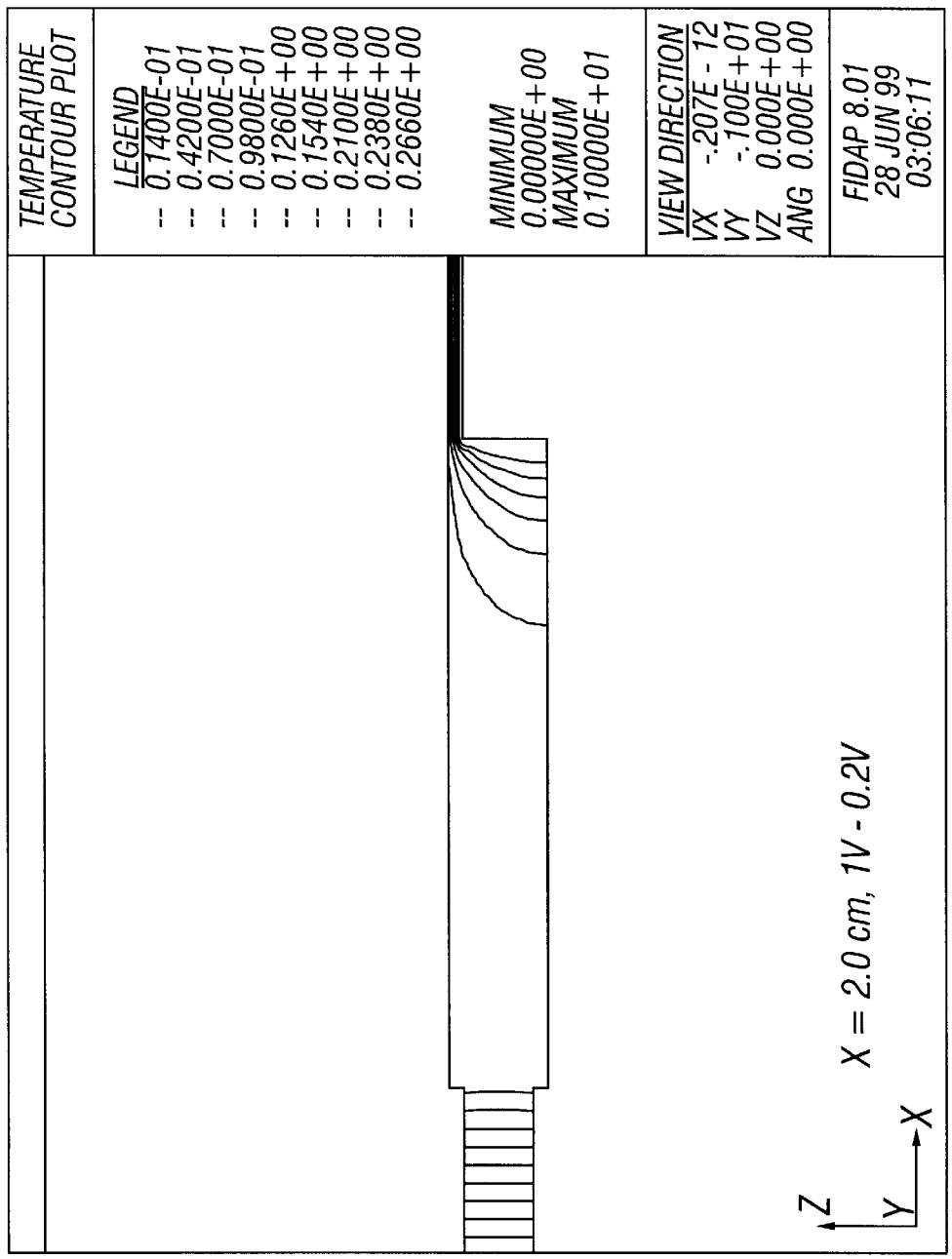
Figure 20:
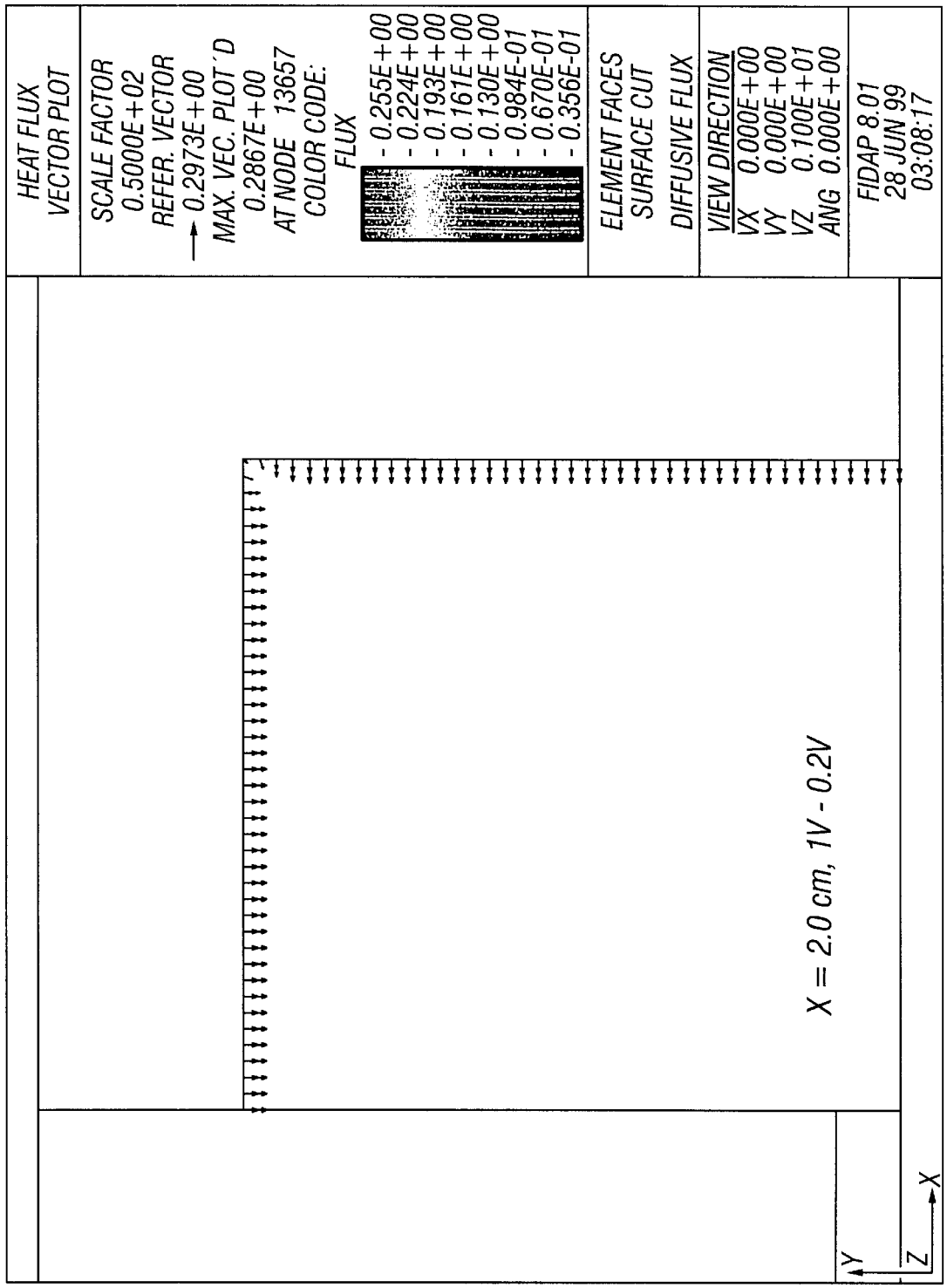
Figure 21:
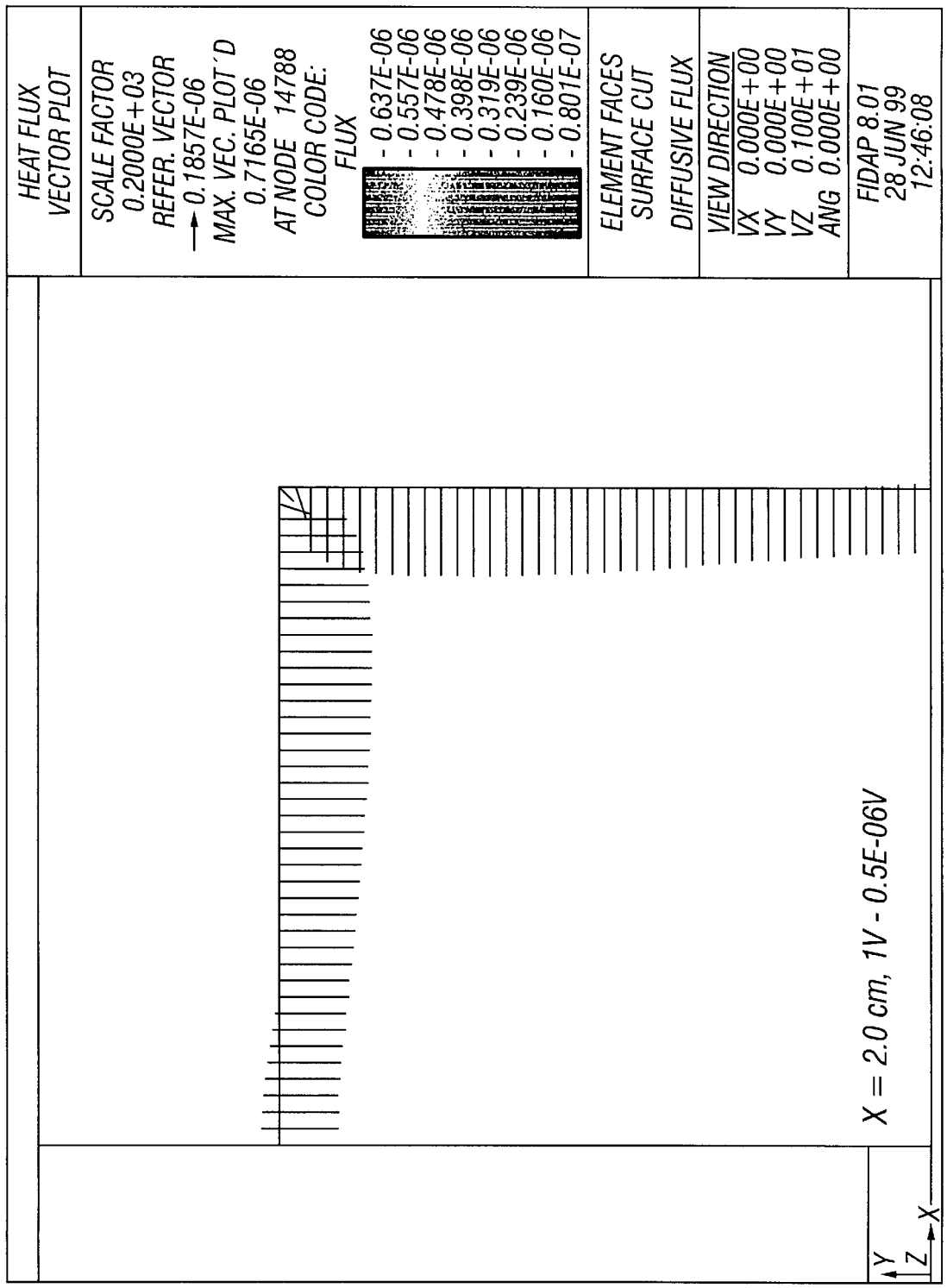
Figure 1:
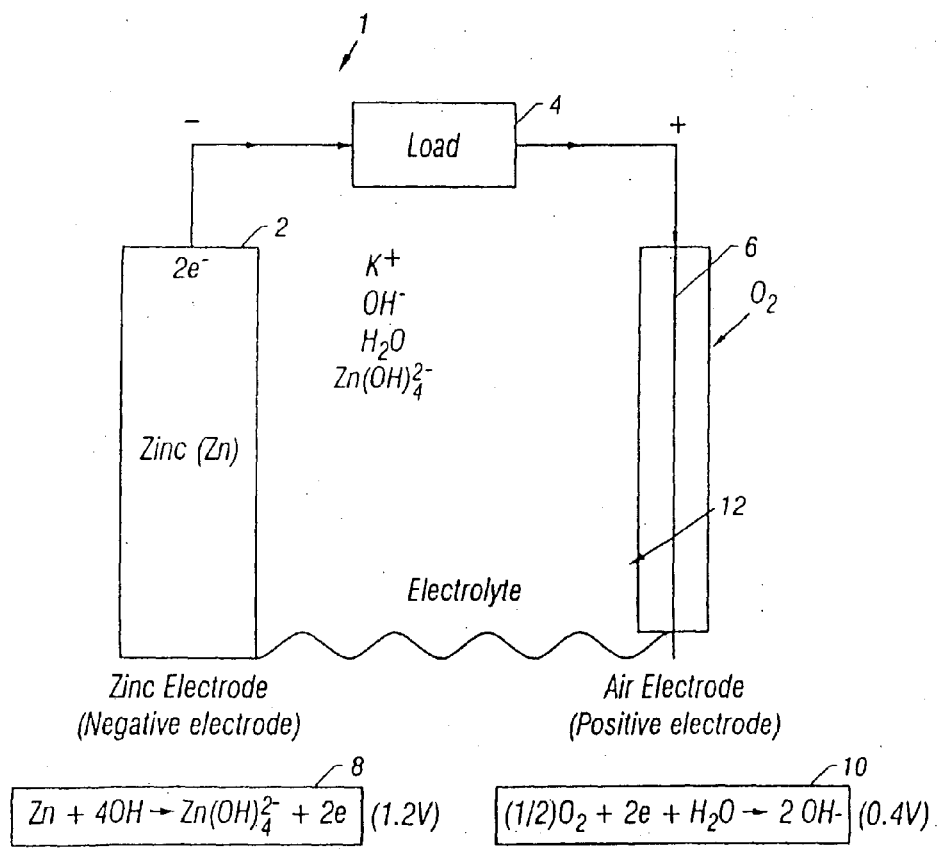
Figure 2:
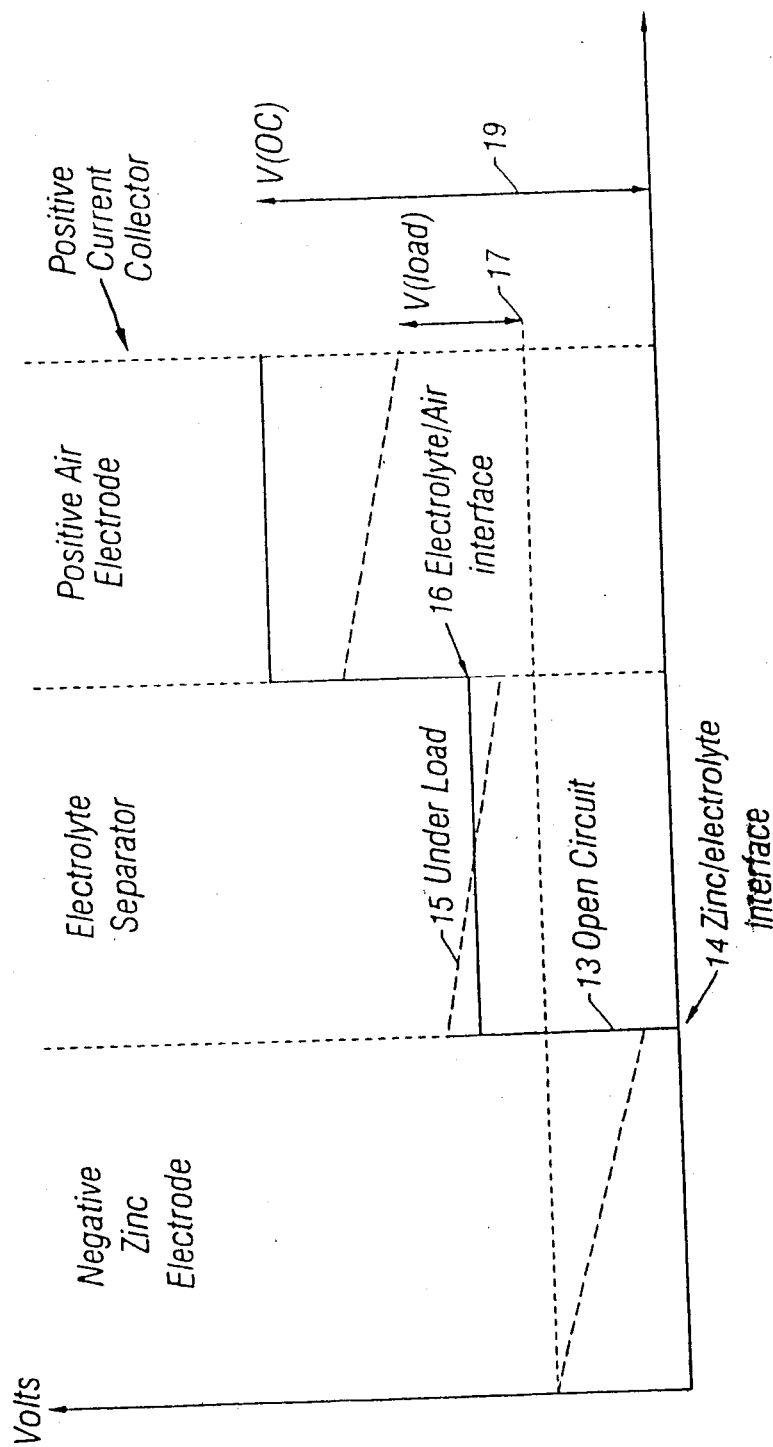
Figure 3:
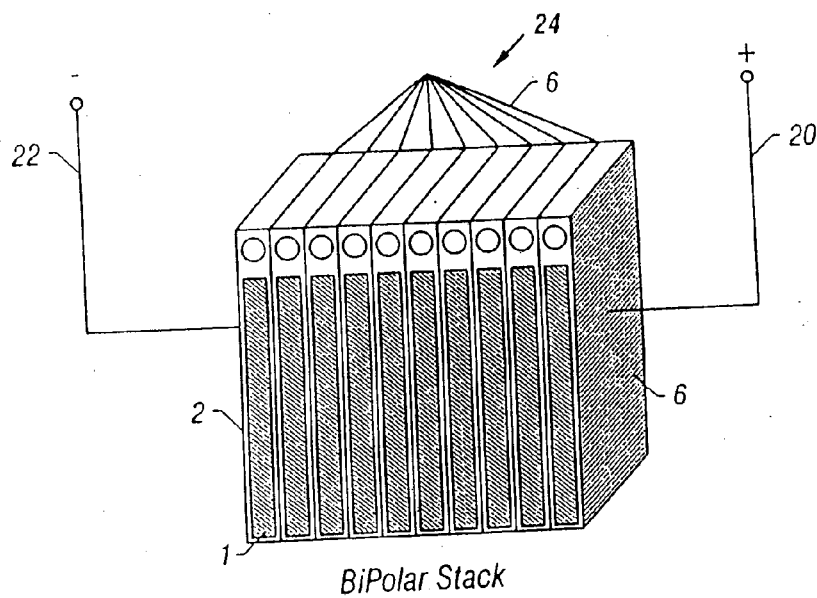
Figure 4:
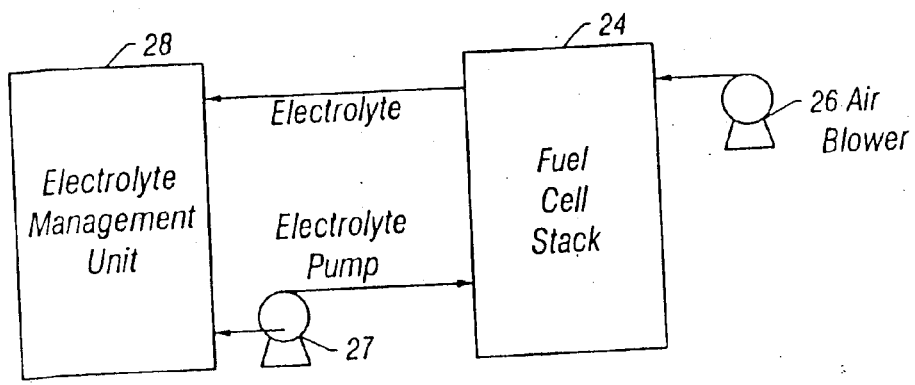
Figure 5:
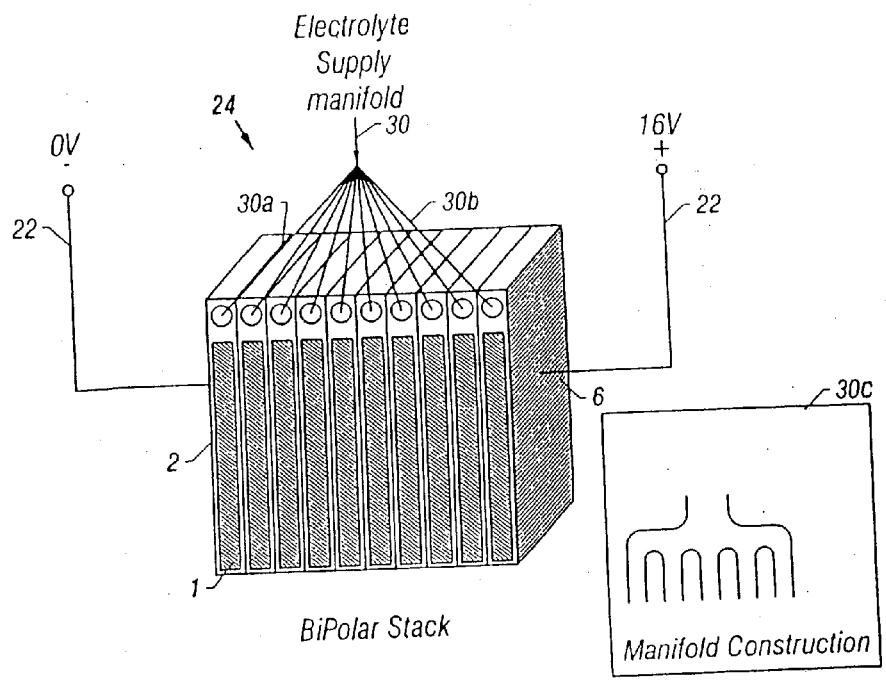
Figure 6:
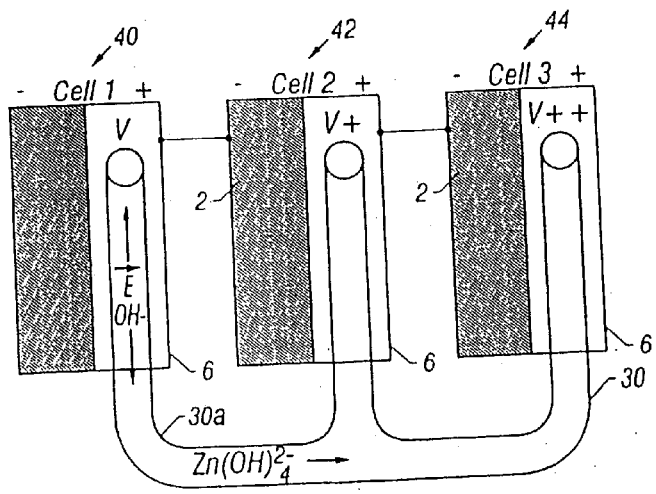
Figure 7:
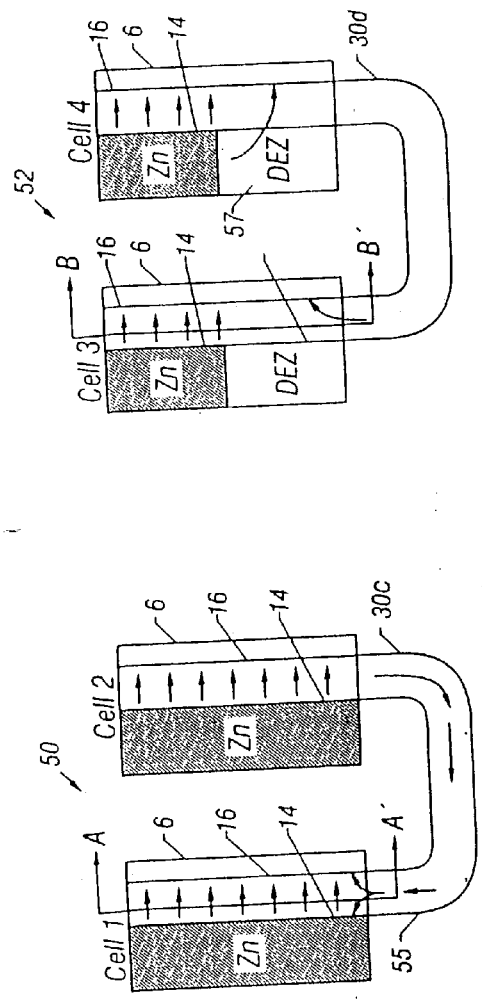
Figure 7:
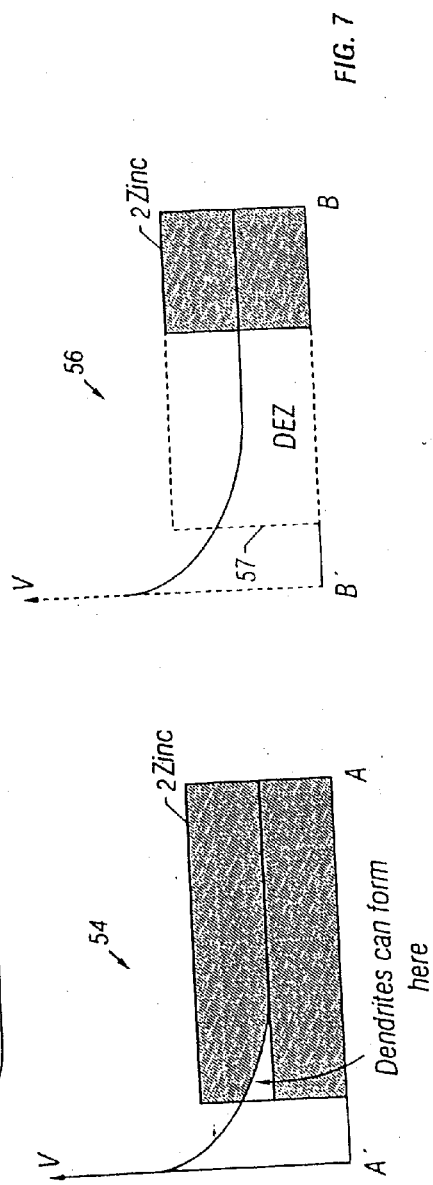
Figure 8:
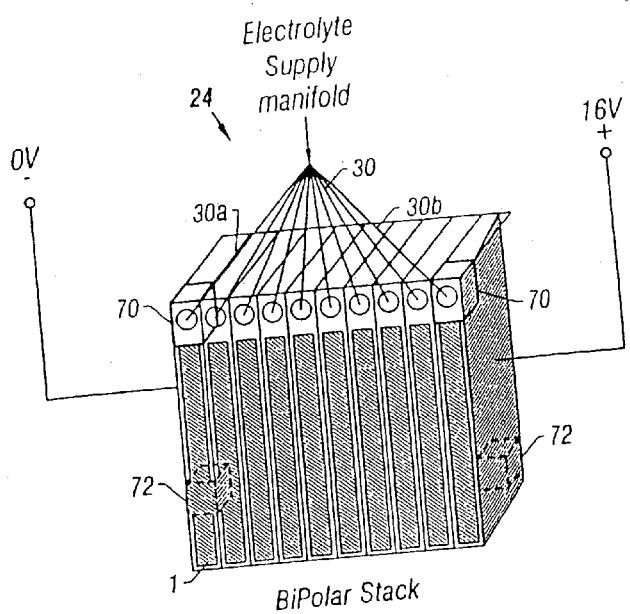
Figure 9:
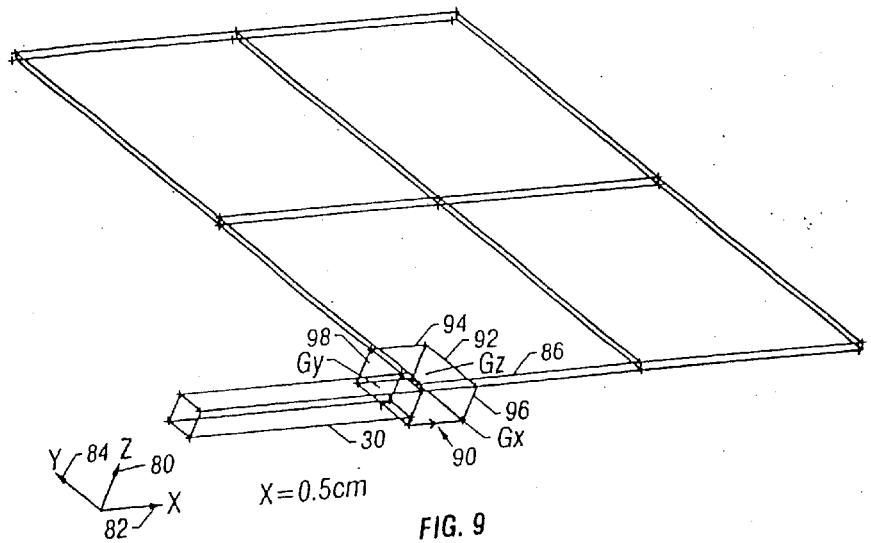
Figure 10:
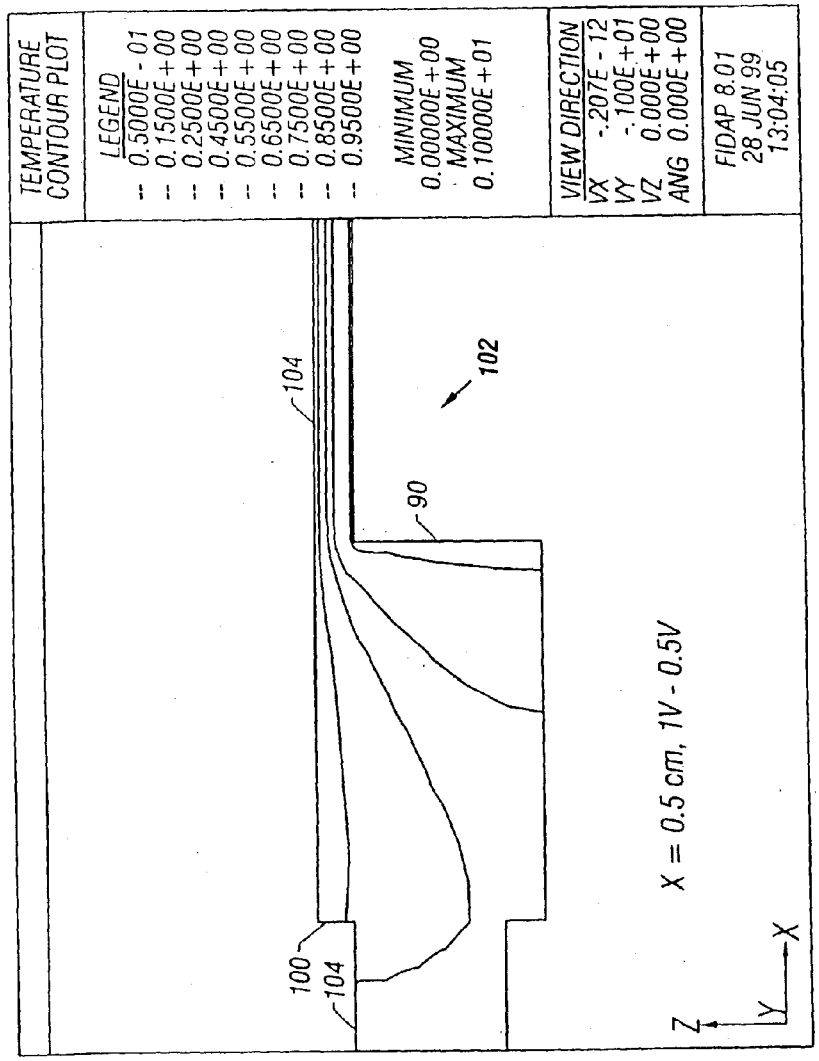
Figure 11:
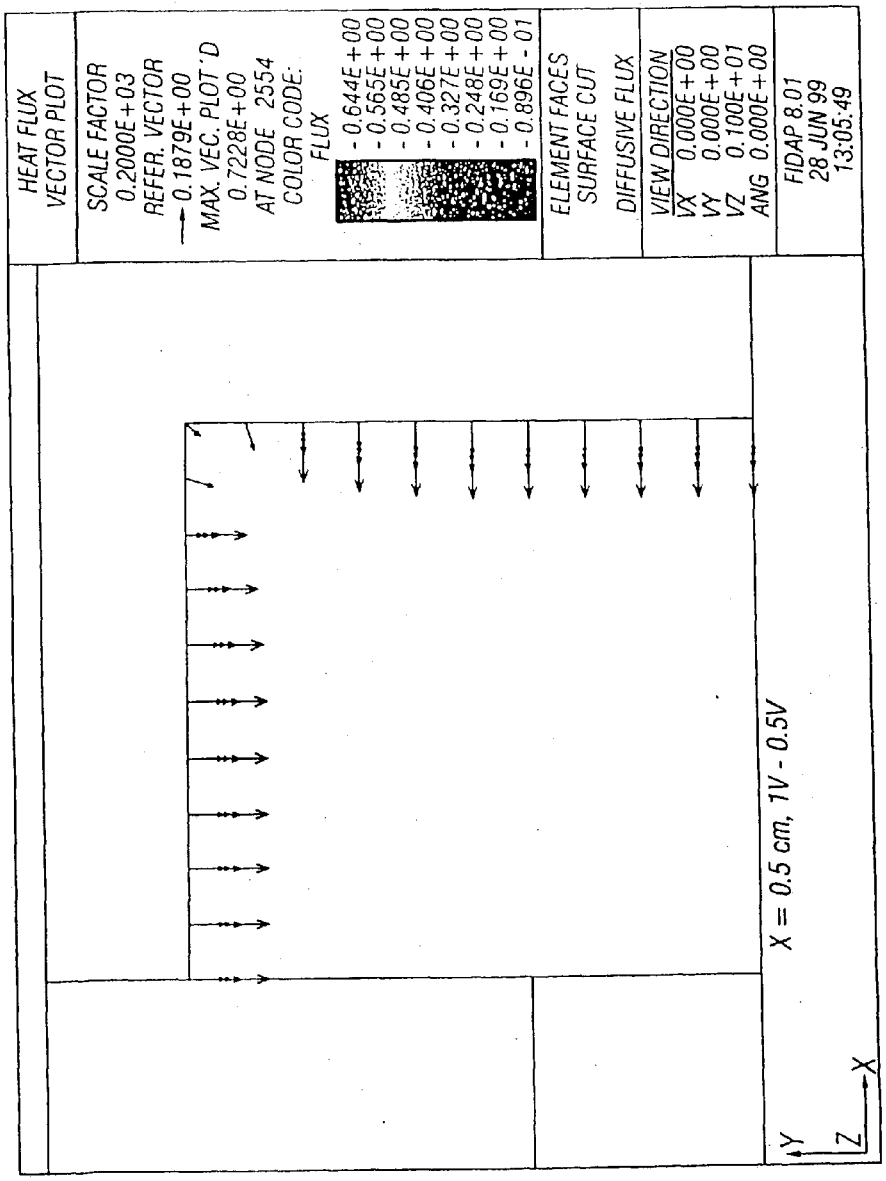
Figure 12:
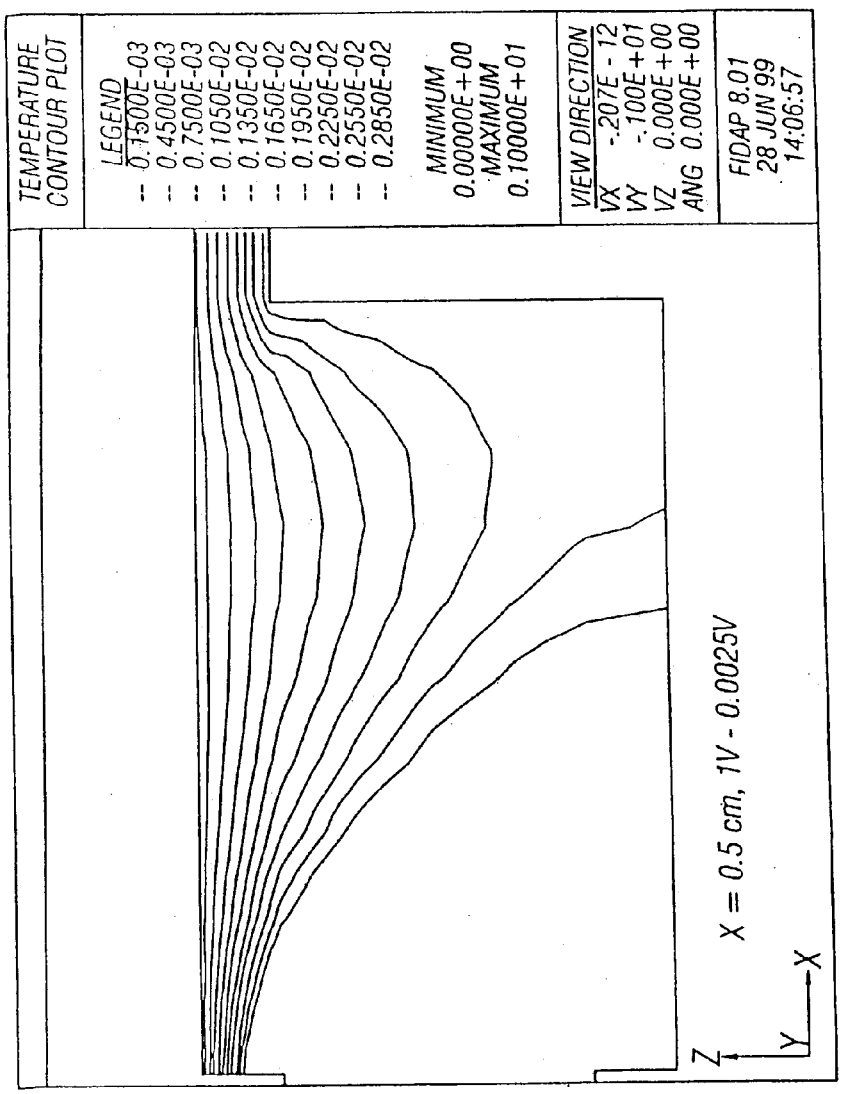

Calculations for FIGS. 10–18 were carried out using a 5 mm by 5 mm DEZ. Results for a 20 mm by 20 mm DEZ appear in FIGS. 19–21. In FIGS. 19 and 20, which have the same viewpoints as FIGS. 10 and 11 but different scales, the electrolyte at the zinc surface has a potential of 0.2 and the potential down slope is seen to be away from the zinc with the current everywhere away from the zinc on this surface. The potential at the zinc surface was then lowered to 0.05, to 0.025, to 0.005, to 0.0005 and finally to $5\times10^{-7}$. Only in the last case shown in FIG. 21 was there any occurrence of current flow into the zinc.

Conclusions

The results above suggest that a 5 mm by 5 mm DEZ would be effective in preventing dendrites provided the potential of the electrolyte at the zinc bordering the DEZ, with respect to the electrolyte on the air side of the separator, was at least ¼ percent of the potential in the electrolyte at the end of the conduit remote from the cell (also with respect to the electrolyte on the air side of the separator). A 20 mm by 20 mm DEZ should be effective at even lower potentials (better than 0.05%). The potential of the electrolyte at the zinc surface, with respect to the electrolyte on the air side of the separator, increases as the cell current is increased.

Consequently the cell is at most risk of dendrites at low current. FIG. 18 allows one to estimate the discharge rate high enough to avoid dendrites. The mass of arrows to the left of the figure indicates the current flow through the separator 86. Looking at the reference vector, or the "Max (imum) Vec(tor) Plot(ted) on the upper right it is clear that these arrows have a value of approximately $0.7\times10^{-3}$. To convert this to real units it is necessary to multiply by the electrolyte conductivity (about 50 ohm$^{-1}$ meter$^{-1}$) and a scale factor of 1000 and by the voltage at the end of the conduit (say 10V in a worst case), giving 350 A/m$^2$.

FIG. 18 is for 0.001 as the potential in the electrolyte at the zinc but dendritic currents appeared significant at 0.002 (FIG. 15) and were absent at 0.0025 (FIG. 13). This being a primary current distribution, the current density through the separator at 0.0025 would be 350 A/m$^2\times$(0.0025/0.001)= 870 A/m$^2$=0.087 A/cm$^2$. As the separator is 27 cm by 16 cm, this yields a current of 0.087×27×16=38 Amp as being the minimum necessary to avoid dendrites. For a 20 mm×20 mm DEZ, the minimum necessary is 9 A. As this current is well below normal operating currents there should be no difficulty with dendrites when a 20 mm by 20 mm (or larger) DEZ is used.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for preventing the formation of dendrites in an electrochemical power source or metal-recovery system comprising:

two or more cells coupled together, wherein each cell includes a metal-containing negative electrode immersed in an electrolyte, and a positive electrode;

at least one manifold comprising a plurality of conduits for providing or removing the electrolyte to or from the two or more cells; and a dendrite elimination zone situated at about an interface between a conduit and a cell, and having a volume determined sufficient to prevent substantial dendrite formation within the zone, the zone characterized by the substantial absence of the negative electrode, or any electronic conductor in electrical contact with the negative electrode, from the volume, and the substantial presence of the positive electrode through the volume or adjacent to the volume.

2. The system of claim 1, wherein the dendrite elimination zone is within said conduit.

3. The system of claim 1, wherein the dendrite elimination zone is within both the cell and the conduit.

4. The system of claim 1, wherein the electrochemical power source is a metal/air fuel cell.

5. The system of claim 1, wherein the electrochemical power source is a metal/air battery.

6. The system of claim 1, wherein the electrochemical power source is a zinc/air fuel cell.

7. The system of claim 1, wherein the electrochemical power source is a zinc/air battery.

8. The system of claim 1, wherein the metal-recovery system is a zinc recovery system.

9. The system of claim 1, wherein the metal negative electrode is comprised of a plurality of zinc particles.

10. The system of claim 1 further comprising a plurality of dendrite elimination zones, wherein the dendrite elimination zones are located within each cell at the manifold entrances and exits.

11. The system of claim 1 further comprising a plurality of dendrite elimination zones, wherein the dendrite elimination zones are located within each manifold conduit.

12. The system of claim 9, wherein the dendrite elimination zone is constructed to prevent the zinc particles from entering the dendrite elimination zone.

13. The system of claim 1, wherein the dendrite elimination zone is positioned in each cell or conduit in a region where shunt currents from other cells are present.

14. The system of claim 1, wherein the dendrite elimination zone is constructed using a porous screen that forms the surfaces of a volume.

15. The system of claim 14, wherein the porous screen is made of a mesh material that is a poor electron conductor.

16. The system of claim 14, wherein the volume is a rectangular block.

17. The system of claim 1 wherein the conduits of the manifold are configured to provide or remove metal particles to or from the cells.

18. The system of claim 1 wherein the volume is such that any shunt current passing through the manifold is substantially routed to the positive electrode.

19. A method for preventing the formation of dendrites in an electrochemical power source or metal recovery system comprising two or more cells coupled together, wherein each cell includes a metal negative electrode and a positive electrode, and each cell is coupled to at least one other with a manifold containing a conductive solution therein, the method comprising the steps of:

operating the power source or metal recovery system, whereby a main current flows from the negative electrode to the positive electrode, in the case of a power source, or from the positive electrode to the negative electrode, in the case of a metal-recovery apparatus, through a cell; and for any shunt current through the manifold that may result, substantially routing the shunt current to the positive electrode of the cell.

20. The method of claim 19, wherein the electrochemical power source is a zinc/air fuel cell.

21. The method of claim 19, wherein the metal negative electrode is comprised of a plurality of zinc particles.

22. The method of claim 19, wherein the routing step occurs by retracting the negative electrode away from the manifold relative to the positive electrode.

23. The method of claim 19, wherein the routing step occurs by extending the positive electrode into the manifold relative to the negative electrode.

24. The method of claim 19, wherein the routing step occurs by increasing the main current between the negative electrode and the positive electrode.

25. The method of claim 19, wherein the routing step occurs by increasing the electric field within the layer of conducting fluid between the negative electrode and the positive electrode.

26. The method of claim 19, wherein the routing step occurs by substantially avoiding any electric field originating in the conductive solution in the manifold from terminating at the negative electrode.

* * * * *

UNITED STATES PATENT AND TRADEMARK OFFICE
CERTIFICATE OF CORRECTION

PATENT NO.   : 6,153,328
DATED        : November 28, 2000
INVENTOR(S)  : Jeffrey A. Colborn It is certified that error appears in the above-identified patent and that said Letters Patent is hereby corrected as shown below:

<u>Drawings,</u>
Please substitute the attached drawings Figures 1-21 in 18 sheets for Figures 1-21

Signed and Sealed this

Second Day of March, 2004

JON W. DUDAS
*Acting Director of the United States Patent and Trademark Office*